United States Patent
Kranich et al.

(10) Patent No.: US 9,645,938 B2
(45) Date of Patent: May 9, 2017

(54) CACHE OPERATIONS FOR MEMORY MANAGEMENT

(71) Applicant: INTEL CORPORATION, Santa Clara, CA (US)

(72) Inventors: Tim Kranich, Braunschweig (DE); Matthias Gries, Braunschweig (DE); Niklas Linkewitsch, Evessen (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/127,483

(22) PCT Filed: Sep. 27, 2013

(86) PCT No.: PCT/US2013/062467
§ 371 (c)(1),
(2) Date: Dec. 18, 2013

(87) PCT Pub. No.: WO2015/047348
PCT Pub. Date: Apr. 2, 2015

(65) Prior Publication Data
US 2016/0203085 A1      Jul. 14, 2016

(51) Int. Cl.
*G06F 12/08*      (2016.01)
*G06F 12/0891*      (2016.01)
(Continued)

(52) U.S. Cl.
CPC ........ *G06F 12/0891* (2013.01); *G06F 9/4406* (2013.01); *G06F 12/0802* (2013.01);
(Continued)

(58) Field of Classification Search
CPC .................... G06F 12/0891; G06F 2212/7211
See application file for complete search history.

(56) References Cited

U.S. PATENT DOCUMENTS

2009/0265514 A1    10/2009    Biles et al.
2010/0228922 A1    9/2010    Limaye
(Continued)

FOREIGN PATENT DOCUMENTS

WO    2013/095404    6/2013

OTHER PUBLICATIONS

International Search Report and Written Opinion for International Application No. PCT/US2013/062467, dated Jun. 25, 2014, 10 pp. [77.288PC1 IISR & WO)].
Dictionary.com, "Victim Cache", [online], [Retrieved on Sep. 11, 2013], retrieved from the Internet at <URL: http://dictionary.reference.com/browse/victim+cache>, 2 pp.

(Continued)

*Primary Examiner* — Albert Wang
(74) *Attorney, Agent, or Firm* — Konrad Raynes Davda & Victor LLP

(57) ABSTRACT

In accordance with the present description, cache operations for a memory-sided cache in front of a backing memory such as a byte-addressable non-volatile memory, include combining at least two of a first operation, a second operation and a third operation, wherein the first operation includes evicting victim cache entries from the cache memory in accordance with a replacement policy which is biased to evict cache entries having clean cache lines over evicting cache entries having dirty cache lines. The second operation includes evicting victim cache entries from the primary cache memory to a victim cache memory of the cache memory, and the third operation includes translating memory location addresses to shuffle and spread the memory location addresses within an address range of the backing memory. It is believed that various combinations of these operations may provide improved operation of a memory. Other aspects are described herein.

24 Claims, 10 Drawing Sheets

(51) Int. Cl.
*G06F 12/0846* (2016.01)
*G06F 9/44* (2006.01)
*G06F 12/0877* (2016.01)
*G06F 12/0893* (2016.01)
*G06F 12/1045* (2016.01)
*G06F 12/12* (2016.01)
*G06F 12/0802* (2016.01)
*G06F 12/126* (2016.01)

(52) U.S. Cl.
CPC ...... *G06F 12/0848* (2013.01); *G06F 12/0877* (2013.01); *G06F 12/0893* (2013.01); *G06F 12/1054* (2013.01); *G06F 12/12* (2013.01); *G06F 12/126* (2013.01); *G06F 2212/1021* (2013.01); *G06F 2212/60* (2013.01); *G06F 2212/69* (2013.01); *Y02B 60/1225* (2013.01)

(56) References Cited

U.S. PATENT DOCUMENTS

| | | | |
|---|---|---|---|
| 2010/0235579 A1* | 9/2010 | Biles | G06F 12/127 711/125 |
| 2011/0093654 A1 | 4/2011 | Roberts et al. | |
| 2012/0191916 A1* | 7/2012 | Chachad | H03K 19/0016 711/122 |
| 2012/0226871 A1 | 9/2012 | Cantin et al. | |
| 2012/0246411 A1 | 9/2012 | Birka et al. | |

OTHER PUBLICATIONS

Hutchinson, C. "What Are the L1, L2 and L3 Caches?", [online], [retrieved on Sep. 11, 2013], retrieved from the Internet at <URL: http://www.ehow.com/info_8480100_l1-l2-l3-caches.html>, 3 pp.
Seznec, A., "A Case for Two-Way Skewed-Associative Caches", Proceedings of the 20th Annual International Symposium on Computer Architecture (ISCA '93), vol. 21, Iss. 2, May 1993, 10 pp.
Shen, B., et al., "APRA: Adaptive Page Replacement Algorithm for NAND Flash Memory Storages", International Forum on Computer Science-Technology and Applications, 2009, 4 pp.
Shi, L., et al., "Write Activity Reduction on Flash Main Memory via Smart Victim Cache", Proceedings of the 20th Symposium on Great Lakes Symposium on VLSI, 2010, 4 pp.
Wikipedia, "Cache (Computing)", [online], last modified Aug. 10, 2013, [retrieved on Sep. 11, 2013], retrieved from the Internet at <URL: http://en.wikipedia.org/wiki/Cache_(computing)>, 7 pp.
Wikipedia, "CPU Cache", [online], last modified Aug. 30, 2013, [retrieve on Sep. 11, 2013], retrieved from the Internet at <URL: http://en.wikipedia.org/wiki/Cache_line>, 11 pp.
International Preliminary Report on Patentability for International Application No. PCT/US2013/062467, dated Apr. 7, 2016, 7 pp. [77.288PCT (IPRP)].
Yoo, Y. et al., "Page Replacement Algorithms for NAND Flash Memory Storages", Proceedings of the 2007 International conference on Computational Science and its Applications, Part I, 2007, 12 pp.

\* cited by examiner

CACHE OPERATIONS FOR MEMORY MANAGEMENT

TECHNICAL FIELD

The present description relates generally to the field of computer systems. More particularly, the present description relates to an apparatus and method for implementing a multi-level memory hierarchy.

BACKGROUND

One of the limiting factors for computer innovation today is memory and storage technology. In conventional computer systems, system memory (also known as main memory, primary memory, executable memory) is typically implemented by dynamic random access memory (DRAM). DRAM-based memory typically consumes power even when no memory reads or writes occur, to recharge internal capacitors. DRAM-based memory is volatile, which means data stored in DRAM memory is lost once the power is removed.

DESCRIPTION OF EMBODIMENTS

Figure 1:
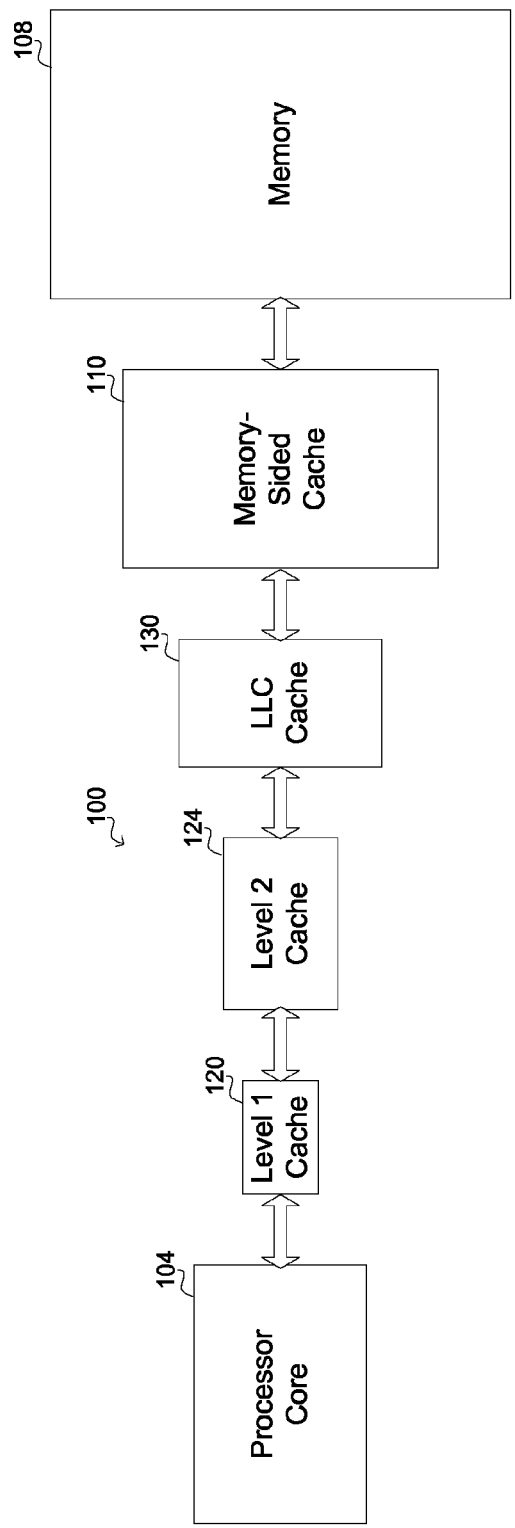
FIG. 1 is a schematic diagram of one embodiment of a memory hierarchy employing cache operations for memory management in accordance with one aspect of the present description.

Conventional computer systems frequently rely on multiple levels of caching to improve performance. A cache is a high speed memory positioned between the processor and a main memory to service memory access requests faster than they could be serviced from system memory. Thus, when the processor needs to read from or write to a location in a system memory, it first checks whether that location is in the cache. If so, a cache "hit" has occurred and the processor immediately reads from or writes to the cache, which is much faster than reading from or writing to main memory. Conversely, if the processor does not find the memory location in the cache, a cache "miss" has occurred. If so, the cache allocates a new entry, and copies in data from main memory. Then, the request is fulfilled from the contents of the cache. Data is typically transferred between main memory and cache in blocks of fixed size, called cache lines. When a cache line is copied from main memory into the cache, a cache entry is created. The cache entry will include the copied data as well as the requested memory location (often called a tag).

Such caches are typically implemented with a volatile memory such as static random access memory (SRAM). Cache management protocols may be used to ensure that the most frequently accessed data and instructions are stored within one of the levels of cache, thereby reducing the number of memory access transactions and improving performance. In order to make room for the new entry on a cache miss, the cache may have to evict one of the existing entries. The heuristic that it uses to choose the entry to evict is called the replacement policy which is applied to associative caches on a number of set entries, typically not comprehensively on the entire cache. In a set associative cache, more than one memory location of the cache may be mapped to a corresponding memory location of the main memory. The fundamental problem with any replacement policy is that it must predict which existing cache entry is least likely to be used in the future. One popular replacement policy, least-recently used (LRU), replaces the least recently accessed entry.

Computer system also typically include non-volatile mass storage (also known as secondary storage or disk storage). Conventional mass storage devices frequently include magnetic media (e.g., hard disk drives), optical media (e.g., compact disc (CD) drive, digital versatile disc (DVD), etc.), holographic media, and flash memory (e.g., solid state drives (SSDs), removable flash drives, etc.). Generally, these storage devices are considered Input/Output (I/O) devices because they are accessed by the processor through various I/O adapters that implement various I/O protocols. These I/O adapters and I/O protocols consume a significant amount of power and can have a significant impact on the die area and the form factor of the platform.

Portable or mobile devices (e.g., laptops, netbooks, tablet computers, personal digital assistant (PDAs), portable media players, portable gaming devices, digital cameras, mobile phones, smartphones, feature phones, etc.) often have limited battery life when not connected to a permanent power supply. Such mobile devices may include removable non-volatile mass storage devices (e.g., Embedded Multimedia Card (eMMC), Secure Digital (SD) card) that are typically coupled to the processor via low-power interconnects and I/O controllers in order to meet active and idle power budgets.

Computer systems also frequently have non-volatile memory to store firmware (such as boot memory (also known as BIOS flash)). A conventional computer system typically uses flash memory devices to store persistent system information (for example, firmware) that is read often but seldom (or never) written to. For example, the initial instructions executed by a processor to initialize key system components during a boot process (Basic Input and Output System (BIOS) images) are typically stored in a flash memory device. Flash memory devices that are currently available in the market generally have limited speed (e.g., 50 MHz). This speed is further reduced by the overhead for read protocols (e.g., 2.5 MHz). In order to speed up the BIOS execution speed, conventional processors generally cache a portion of BIOS code during the Pre-Extensible Firmware Interface (PEI) phase of the boot process. The size of the processor cache places a restriction on the size of the BIOS code used in the PEI phase (also known as the "PEI BIOS code").

Three dimensional (3D) cross point memory devices (e.g., Phase-change memory (PCM)) are a type of non-volatile computer memory. PCM, also sometimes referred to as phase change random access memory (PRAM or PCRAM), PCME, Ovonic Unified Memory, or Chalcogenide RAM (C-RAM), exploits the unique behavior of chalcogenide glass. As a result of heat produced by the passage of an electric current, chalcogenide glass can be switched between two states: crystalline and amorphous. Recent versions of PCM can achieve two additional distinct states. PCM often provides higher performance than flash because the memory element of PCM can be switched more quickly. Also, in PCM, writing (changing individual bits to either 1 or 0) can be performed on a byte basis without the need to first erase an entire block of cells. Further, degradation from writes is typically slower (a PCM device may survive approximately 100 million write cycles. PCM degradation is typically due to thermal expansion during programming, metal (and other material) migration, and other mechanisms.

Other types of NVRAM include byte-addressable persistent memory (BPRAM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, Spin Transfer Torque (SST) Memory, SPRAM (spin-transfer torque RAM), STRAM (spin tunneling RAM), magnetoresistive memory, magnetic memory, magnetic random access memory (MRAM)), and Semiconductor-oxidenitride-oxide-semiconductor (SONGS, also known as dielectric memory).

The characteristics of NVRAM varies depending upon the particular technology employed. For example, a particular NVRAM may offer higher performance characteristics in some areas while providing higher access latency and energy consumption as compared to other memory technologies.

Memory capacity and performance requirements continue to increase with an increasing number of processor cores and new usage models such as virtualization. In addition, memory power and cost have become a significant component of the overall power and cost, respectively, of electronic systems. In accordance with the present description, cache operations for a memory-sided cache in front of a main memory (referred to herein as a backing memory) such as a byte-addressable non-volatile memory, include combining at least two of a first operation, a second operation and a third operation, wherein the first operation includes evicting victim cache entries from the cache memory in accordance with a replacement policy which is biased to evict cache entries having clean cache lines over evicting cache entries having dirty cache lines. A dirty cache line is a line of data that has been modified in cache but not yet written back to the byte-addressable non-volatile memory. A victim cache entry is a cache entry which has been selected to be evicted from the cache.

The second operation includes at least one (or both) of evicting victim cache entries from the primary cache memory to a victim cache memory of the cache memory, and evicting victim cache entries from the victim cache memory, and the third operation includes translating memory location addresses to shuffle and spread the memory location addresses within an address range of the byte-addressable non-volatile memory. It is believed that various combinations of these operations may provide improved operation of a memory.

In one embodiment, a memory-sided cache functions primarily as a filter for write access to the byte-addressable non-volatile memory. For example, an alternative replacement policy may be implemented which prefers clean cache lines over dirty ones for cache line evictions to reduce the number of write backs to the byte-addressable non-volatile backing memory. This alternative replacement policy (referred to herein as a clean eviction first (CEF) policy may be combined with adding a victim cache partition to a main cache partition of the memory-sided cache, in which the victim cache partition is dedicated in one embodiment, to store only dirty cache lines to separate write traffic further.

It is appreciated that implementation of one or both of the clean eviction first policy and the victim cache partition may affect system performance. However, it is believed that a degree of performance may be usefully traded to filter write traffic from the byte-addressable non-volatile memory and to enhance energy efficiency and memory endurance, in some embodiments.

To the clean eviction first policy, or to the provision of a victim cache partition (or to both) may be added address translation at the input of one or more memory elements such as the memory-sided cache or at the output of one or more memory elements, to provide traffic shuffling and spreading among the available address space of the byte-addressable non-volatile memory to facilitate or enhance wear leveling of the address locations of the byte-addressable non-volatile backing memory. Moreover, in some embodiments, multi-level address translation may be realized by address translation at multiple locations along the path of memory operations. Thus, address translation may be provided at both the input and the output of a memory element such as the memory-sided cache, for example. It is appreciated that such address translation may also be provided between partitions. It is believed that multi-level address translation in accordance with the present description may reduce pressure on wear leveling algorithms for the byte-addressable non-volatile memory and also reduce or eliminate vulnerability to certain malicious attacks on the limited endurance of the byte-addressable non-volatile backing memory. It is appreciated that other features may be realized in addition to or instead of these referred to herein.

Accordingly, in one embodiment of a memory-sided cache in accordance with the present description, use of a primary cache may be combined with use of both a dirty victim cache and address translation by the cache. In another embodiment, a clean eviction first policy may be combined with address mapping by the cache. In still another embodiment, a clean eviction first policy for a primary cache may be combined with use of a dirty victim cache. In yet another embodiment, a clean eviction first policy for a primary cache may be combined with use of a dirty victim cache and address mapping by the cache. Other combinations may be realized, depending upon the particular application.

In accordance with another aspect of the present description, it is appreciated that one or more of the write filtering policies such as the clean eviction first policy, and the victim cache partition policy, and the wear leveling policies such as the address translation policy, may be alternately enabled and disabled and in various combinations "on the fly" or as the device is initialized in a boot process, for example, to improve device lifetime, energy efficiency, or performance, as the system operates and operational conditions change such as the execution phase of the work load. Thus, the system may transition from a clean eviction first policy to a more performance-driven least-recently-used policy and back again to the clean eviction first policy as conditions warrant. For example, if the system is experiencing a relatively light workload, the clean eviction first policy may be enabled to reduce write traffic to the byte-addressable non-volatile memory at a point where a reduction in memory operational performance may have less impact to overall system performance. Similarly, the victim partition may be flushed and disabled and then subsequently enabled and reloaded with dirty victim lines, depending upon various factors such as the execution phase of the workload. Similarly, address translation may be alternately enabled and disabled as the device is booted and rebooted, and as conditions warrant. In this manner, selective enabling and disabling of various combinations of write filtering and address translation policies provides additional flexibility for trading off performance for device lifetime and energy efficiency, as the device operates and device operational conditions change.

FIG. 1 illustrates a system 100 including a processor core 104, a backing memory 108 and a memory-sided cache 110 employing cache operations for memory management according to one embodiment of the present description. The memory-sided cache 110 performs the cache operations in connection with the byte-addressable non-volatile backing memory 108 which, in the illustrated embodiment may be a non-volatile random access memory ("NVRAM"), for example. In one embodiment, the system 100 may include various levels of cache in addition to the memory-sided cache 110, including a level 1 cache 120, a level 2 cache 124, and a Lower Level Cache (LLC) cache 130. It is appreciated that a system in accordance with the present description may have greater or fewer numbers of caches, memories and processor cores than those depicted, depending upon the particular application.

In the illustrated embodiment, performance may be enhanced by implementing a cache such the memory-sided cache 110 with a relatively small amount of a relatively higher-speed memory such as DRAM while implementing the backing memory 108 which in this embodiment, is the bulk of the system memory, using significantly cheaper and denser byte-addressable non-volatile random access memory (NVRAM). In addition to system memory, it is appreciated that the memory-sided cache 110 and backing memory 114 may be implemented as other types of memory devices such as data storage devices, for example, depending upon the particular application.

There are many possible technology choices for NVRAM to implement the backing memory 108, including PCM, byte-addressable persistent memory (BPRAM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM), STRAM (spin tunneling RAM), magnetoresistive memory, magnetic memory, magnetic random access memory (MRAM)), and Semiconductor-oxidenitride-oxide-semiconductor (SONGS, also known as dielectric memory). For use in one embodiment of the system 100 described herein, NVRAM has the following characteristics:

(1) It maintains its content even if power is removed, similar to FLASH memory used in solid state disks (SSD), and different from SRAM and DRAM which are volatile;

(2) lower power consumption when idle than volatile memories such as SRAM and DRAM;

(3) random access similar to SRAM and DRAM (also known as randomly addressable);

(4) rewritable and erasable at a lower level of granularity (e.g., byte level, word level, cache line level, etc.) than FLASH used in SSDs (which can only be rewritten and erased a "block" at a time—minimally 64 Kbyte in size for NOR FLASH and 16 Kbyte for NAND FLASH);

(5) usable as a system memory and allocated all or a portion of the system memory address space; and (6) one or more of the following:

a) faster write speed than non-volatile memory/storage technologies such as FLASH and a write latency higher than for DRAM;

b) very high read speed (faster than FLASH and near or equivalent to DRAM read speeds);

c) directly writable (rather than requiring erasing (overwriting with 1 s) before writing data like FLASH memory used in SSDs);

d) orders of magnitude (e.g., 2 or 3) higher write endurance before failure (more than boot ROM and FLASH used in SSDs); and/or e) energy cost is higher and available peak bandwidth is lower for writes as compared to reads.

As mentioned above, in contrast to FLASH memory, which is typically rewritten and erased a complete "block" at a time, the level of granularity at which NVRAM is accessed in any given implementation may depend on the particular memory controller and the particular memory bus or other type of bus to which the NVRAM is coupled. For example, in some implementations where NVRAM is used as system memory, the NVRAM may be accessed at the granularity of a cache line (e.g., a 64-byte or 128-Byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "memory-sided cache") used in the same memory subsystem. Even so, the level of granularity of access to the NVRAM by the memory controller and memory bus or other type of bus is smaller than that of the block size used by Flash and the access size of the I/O subsystem's controller and bus. NVRAM may also incorporate wear leveling algorithms to account for the fact that the storage cells at the byte-addressable non-volatile memory level may begin to wear out after a number of write accesses, especially where a significant number of writes may occur such as in a system memory implementation. Since high cycle count blocks are most likely to wear out in this manner, wear leveling spreads writes across the byte-addressable non-volatile memory cells by swapping addresses of high cycle count blocks with low cycle count blocks. Note that most address swapping is typically transparent to application programs because it is handled by hardware, lower-level software (e.g., a low level driver or operating system), or a combination of the two. It is believed that address translation at the cache level in accordance with the present description may permit a relaxation or reduction in wear leveling operations within the NVRAM itself.

The backing memory 108 of some embodiments of the present description is implemented with NVRAM, but is not necessarily limited to any particular memory technology. Backing memory 108 is distinguishable from other instruction and data memory/storage technologies in terms of its characteristics and/or its application in the memory/storage hierarchy. For example, backing memory 108 is different from:

1) static random access memory (SRAM) which may be used for one or more of the caches 120-130 which may be internal (e.g., on the same die as the processor core 104) or external to a processor core (e.g., in the same or a different package from the processor core 104), and may be dedicated to a particular processor core or may be shared by various processor cores;

2) dynamic random access memory (DRAM) which may be used for one or more of the caches 120-130 which may be internal (e.g., on the same die as the processor core 104) or external to a processor core (e.g., in the same or a different package from the processor core 104), and may be dedicated to a particular processor core or may be shared by various processor cores;

3) FLASH memory/magnetic disk/optical disc applied as mass storage (not shown); and 4) memory such as FLASH memory or other read only memory (ROM) applied as firmware memory (which can refer to boot ROM, BIOS Flash, and/or TPM Flash). (not shown).

Backing memory 108 may be used as instruction and data storage that is directly addressable by a processor 104 and is able to sufficiently keep pace with the processor 104 in contrast to FLASH/magnetic disk/optical disc applied as mass storage. Moreover, as discussed above and described in detail below, backing memory 108 may be placed on a memory bus and may communicate directly with a memory controller that, in turn, communicates directly with the processor 104. Backing memory 108 may be combined with other instruction and data storage technologies (e.g., DRAM) to form hybrid memories (also known as Co-locating PCM and DRAM; first level memory and second level memory; FLAM (FLASH and DRAM)). Note that at least some of the above technologies, including PCM may be used for mass storage instead of, or in addition to, system memory, and need not be random accessible, byte-addressable or directly addressable by the processor when applied in this manner.

For convenience of explanation, most of the remainder of the application will refer to "NVRAM" or, more specifically, "3D cross point memory," as the technology selection for the byte-addressable non-volatile memory 108. As such, the terms NVRAM, 3D cross point memory, and backing memory may be used interchangeably in the following discussion. However it should be realized, as discussed above, that different technologies may also be utilized for backing memory. Also, NVRAM is not limited for use as backing memory.

"Memory-sided cache" 110 is an intermediate level of memory configured in front of a backing memory 108 that has, in one embodiment, lower read/write access latency relative to the byte-addressable non-volatile memory and/or more symmetric read/write access latency (i.e., having read times which are roughly equivalent to write times). In some embodiments, the memory-sided cache 110 has significantly lower write latency than the byte-addressable non-volatile memory 108 but similar (e.g., slightly lower or equal) read latency; for instance the memory-sided cache 110 may be a volatile memory such as volatile random access memory (VRAM) and may comprise a DRAM or other high speed capacitor-based memory. Note, however, that the underlying principles of the present description are not limited to these specific memory types. Additionally, the memory-sided cache 110 may have a relatively lower density and/or may be more expensive to manufacture than the byte-addressable non-volatile memory 108. In one embodiment, memory-sided cache 110 is configured between the byte-addressable non-volatile memory 108 and the processor caches 120-130. In some of the embodiments described below, memory-sided cache 110 is configured as one or more memory-side caches (memory-sided cache 110s) to mask the performance and/or usage limitations of the byte-addressable non-volatile memory including, for example, read/write latency limitations and memory degradation limitations. In these implementations, the combination of the caches 120-130, memory sided cache 110 and backing memory 108 operates at a performance level which approximates, is equivalent or exceeds a system which uses only DRAM as system memory. As discussed in detail below, although shown as a "cache" in FIG. 1, the memory-sided cache 110 may include modes in which it performs other roles, either in addition to, or in lieu of, performing the role of a cache.

Memory-sided cache 110 can be located on the processor die and/or located external to the processor die (e.g., on a separate die located on the CPU package, located outside the CPU package with a high bandwidth link to the CPU package, for example, on a memory dual in-line memory module (DIMM), a riser/mezzanine, or a computer motherboard). The memory-sided cache 110 may be coupled in communicate with the processor core 104 using a single or multiple high bandwidth links, such as DDR or other transactional high bandwidth links. In one embodiment, the memory-sided cache 110 has a memory capacity that is at least one-eighth that of the active working set size (WSS) of a workload. It is appreciated that the size of the active working set size (WSS) of a workload may vary depending upon the application such as a handheld device, a client device or a server. It is further appreciated that other relative sizes may be appropriate, depending upon the particular application.

Caches are frequently organized as set associative in which more than one memory location of the memory-sided cache 110 may be mapped to a corresponding memory location of the byte-addressable non-volatile memory 104. A cache is typically limited to a size which is substantially smaller than that of the byte-addressable non-volatile memory from which the cache entries are obtained. Accordingly, to keep the number of cache entries within the limited capacity of the cache, a replacement policy is frequently employed to replace cache entries which are deemed to be less likely to be requested by the processor core with different cache entries which are deemed to be more likely to be requested by the processor core.

A common replacement policy is a least recently used (LRU) replacement policy in which a cache entry which was least recently used in a memory request is evicted from the cache and replaced with a cache entry which is hopefully more likely to be the object of a memory request. The LRU algorithm of an LRU replacement policy typically does not consider dirty flags used to mark dirty cache entries during victim selection.

Figure 2:
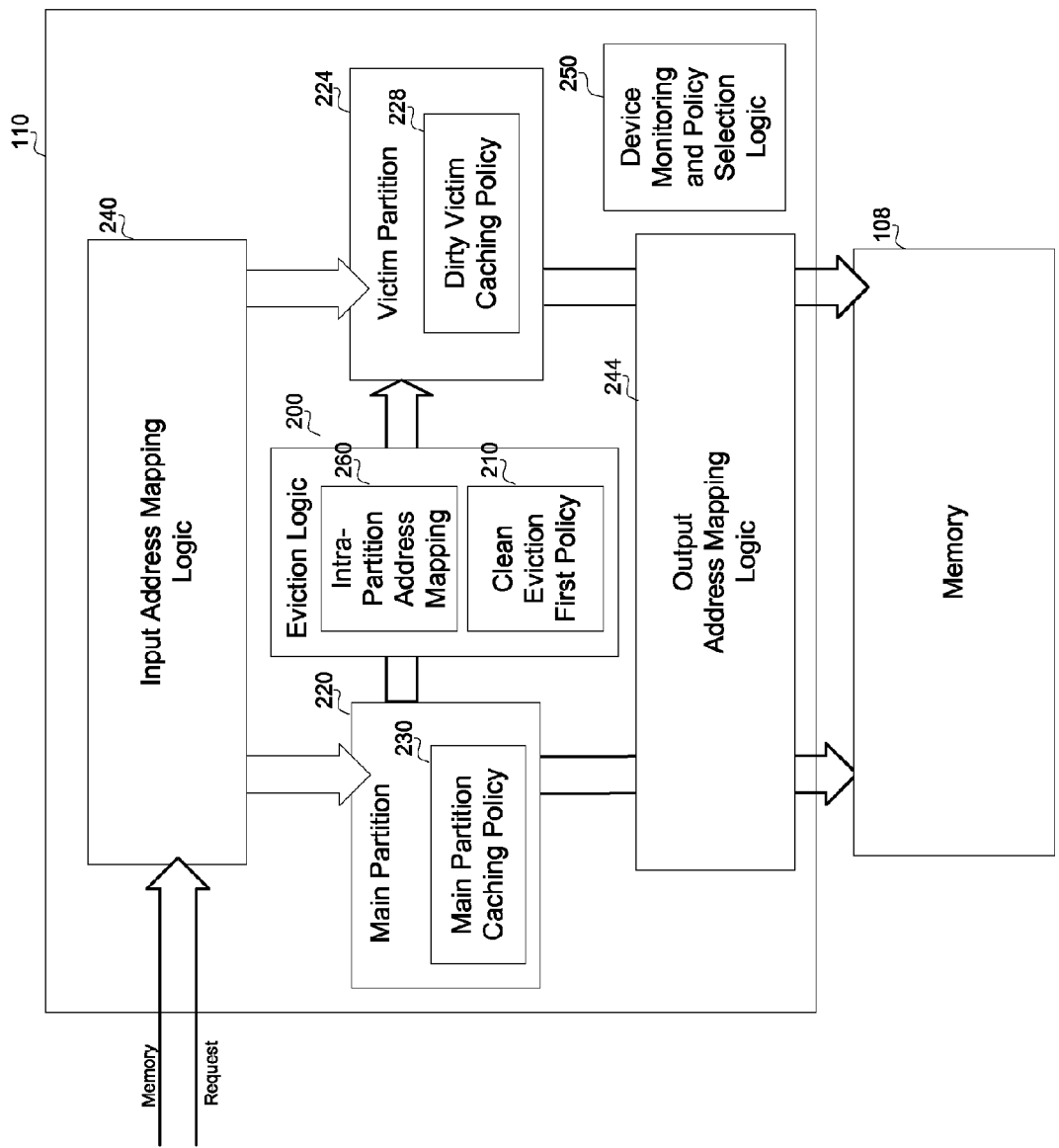
FIG. 2 is a schematic diagram of one embodiment of a memory-sided cache of the memory hierarchy of FIG. 1.

FIG. 2 is a schematic diagram of one embodiment of a memory-sided cache 110 having an eviction logic 200 which may be enabled to select an alternative cache entry replacement policy 210 in accordance with one aspect of the present description. In the illustrated embodiment, one alternative cache entry replacement policy 210 which may be selected is a clean eviction first (CEF) policy which represents a class of policies that favor evicting clean cache lines over dirty ones to reduce write back traffic to the byte-addressable non-volatile memory 108.

In another aspect of the present description, the memory-sided cache 110 may be selectively enabled to partition its memory locations into two or more partitions such as a main partition 220 and a second partition, which in the illustrated embodiment, is a victim partition 224. For example, instead of draining dirty cache victims to the byte-addressable non-volatile memory 108, those dirty cache entries being evicted from the main partition 220 by the eviction logic 200 may be captured in a dedicated cache partition, the victim partition 224, pursuant to a dirty victim caching policy 228 which may be selectively enabled. A dirty cache line may in turn be evicted from the dirty victim partition 224 in accordance with the clean eviction first policy 210. If the victim partition 224 is dedicated to dirty victims only, the dirty victim partition 224 would not contain clean cache lines. A dirty cache line evicted from the dirty victim partition 224 is written back to the byte-addressable non-volatile memory 108 to preserve the write data written to that cache entry.

In the illustrated embodiment, insofar as cache read and write operations are concerned, both cache partitions, the main partition 220 and the victim partition 224, operate effectively as one cache. Thus, a cache look-up scans both partitions 220, 224. Thus, in this embodiment, a cache line is either present in the main 220 or in the victim partition 224. In filling the memory-sided cache, in one embodiment, new cache lines may be inserted into the main partition 220 in accordance with a main partition caching policy 230, rather than the victim partition 224 so that the victim partition 224 only holds the dirty evictions from the main partition 220.

In the illustrated embodiment, a particular portion of the available cache capacity of the memory-sided cache 110 may dedicated exclusively to the victim partition 224 for caching dirty cache lines. It is believed that enabling dirty victim caching in a dedicated victim partition such as the partition 224, may facilitate reducing the overall capacity of the memory-sided cache 110 by as much as 25% without significantly impacting the amount of write back traffic to the byte-addressable non-volatile memory 108. Accordingly, in some embodiments, a smaller, less expensive memory-sided cache 110 may be substituted for a larger more expensive cache, with any increase in write back traffic to the byte-addressable non-volatile memory 108 as a result of the overall reduction in size of the cache 110, remaining within acceptable limits.

In one embodiment, a viable allocation of capacity for the victim partition 224 is at least one fourth to one half the capacity of the main partition 220, which is a significant allocation of capacity. Also, it is believed that the associativity of the victim partition 224 performs favorably at half that of the associativity of the main partition 220. If the victim partition 224 is too small, it is believed that a condition may result in which there are more evictions from the victim partition 224 than hits on dirty cache lines. If so, the efficacy of caching victims may be reduced. Conversely if too much cache space is assigned to the victim partition 224, it is believed that overall cache performance may drop because cache hits may favor writes and reads to dirty cache lines at the expense of cache hits to clean cache lines in the main partition 220. In general, it is believed that the suitable size and associativity of a particular partition may be vary, depending upon the particular application.

In yet another aspect of the present description, address translation may be selectively enabled for a memory-sided cache 110. In the illustrated embodiment, an input address mapping logic 240 is provided at the input of the memory-sided cache 110 to map the addresses of memory requests from the processor core 104. In addition, an output address mapping logic 244 is provided at the output of the memory-sided cache 110 to map again the mapped addresses of the input address mapping logic 240. It is believed that one or more such mapping or remapping operations may achieve improved traffic shuffling and spreading within the available address space of the byte-addressable non-volatile memory 108. It is believed that increased traffic distribution facilitates extending the average life time of a non-volatile memory such as the byte-addressable non-volatile memory 108 by reducing pressure on wear-leveling algorithms and reducing the impact of malicious attacks. As explained in greater detail below, the address mapping logic of the illustrated embodiment may include an exclusive-or based mapping function. It is appreciated that other mapping functions may be used, depending upon the particular application.

Figure 3:
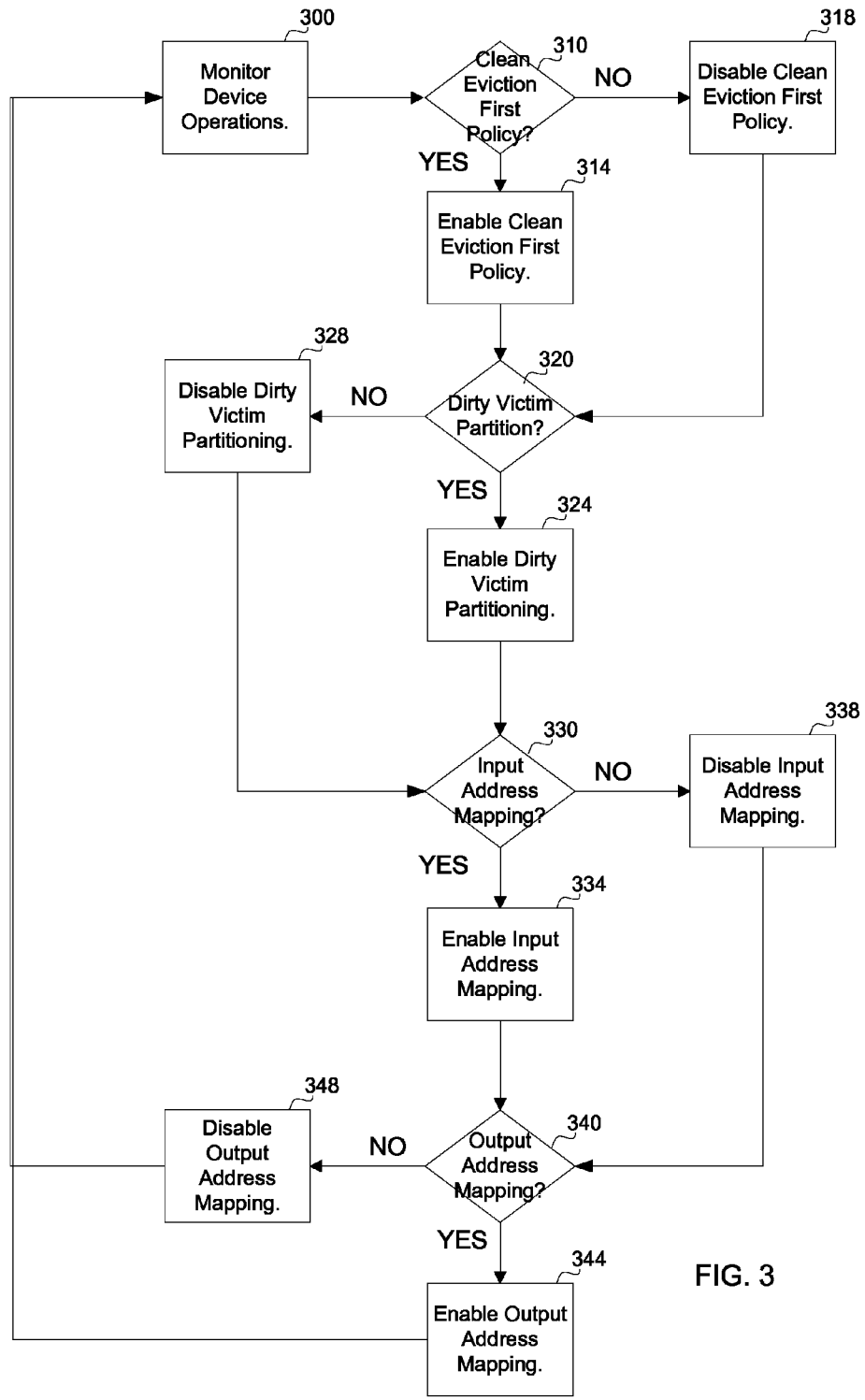
FIG. 3 depicts one embodiment of operations in accordance with one aspect of the present description, selectively enabling and disabling write back filtering and traffic leveling operations in response to monitored conditions.

In still another aspect of the present description, the memory-sided cache 110 includes device monitoring and policy selection logic 250. FIG. 3 depicts an example of operations of a memory-sided cache 110 in which one or more of the write filtering policies such as the clean eviction first policy, and the victim cache partition policy, and the wear leveling policies such as the address translation policy, may be selectively and alternately enabled and disabled and in various combinations "on the fly" to improve device lifetime, energy efficiency, or performance, as the system operates and operational conditions change such as the execution phase of the work load.

In a first operation, device operations are monitored (block 300). For example, the level of the workload experienced by the device may be monitored by logic such as the device monitoring logic 250 of FIG. 2. Also, the state of the device may be monitored. For example, the device may be in a boot process in which initial instructions are executed by a processor to initialize key system components during a boot process (Basic Input and Output System (BIOS) images). Based upon existing conditions such as device workload or the state of the device, a decision may be made by the logic 250 in real time as the device operates, as to whether (block 310) an alternative replacement policy such as the clean eviction first policy, for example, should be employed. If so, the clean eviction first policy is enabled (block 314). Conversely, based upon existing conditions such as device state or workload, a decision may be made by the logic 250 in real time as the device operates, to disable (block 318) the clean eviction first policy. Thus, the system may transition from a clean eviction first policy to a more performance-driven least-recently-used policy, for example, and back again to the clean eviction first policy as conditions warrant. For example, if the system is experiencing a relatively light workload, the clean eviction first policy may be enabled to reduce write traffic to the byte-addressable non-volatile memory at a point where a reduction in memory operational performance may have less impact to overall system performance. Similarly, the clean eviction first policy may be enabled or disabled during the boot process.

Further, based upon existing conditions such as device state or workload, a decision may be made by the logic 250 in real time as the device operates, as to whether (block 320)

a dirty victim partition should be employed. If so, the dirty victim partition is enabled (block 324). Conversely, based upon existing conditions such as workload, a decision may be made by the logic 250 in real time as the device operates, to disable (block 328) a previously enabled dirty victim partition. If so, the victim partition may be flushed and disabled and then subsequently enabled and reloaded with dirty victim lines, depending upon various factors such as the execution phase of the workload. Similarly, the victim partition may be enabled or disabled during the boot process.

Moreover, based upon existing conditions such as device state, a decision may be made by the logic 250 as to whether (block 330) input address mapping should be employed. If so, the input address mapping is enabled (block 334). Conversely, based upon device state, a decision may be made by the logic 250 to disable (block 338) a previously enabled input address mapping. In a similar manner, a decision may be made by the logic 250 as to whether (block 340) output address mapping should be employed. If so, the output address mapping is enabled (block 344) or if not, disabled (block 348). For example, address translation may be selectively enabled or disabled during the boot process at the cache memory input, output and/or between partitions in response to user selected inputs or the particular boot instructions installed for a device. In this manner, selective enabling and disabling of various combinations of write filtering and address translation policies provides additional flexibility for trading off performance for device lifetime and energy efficiency, as the device operates and device operational conditions change or as the device is initialized in a boot process, for example.

It is appreciated that in other embodiments, one or more of the replacement policy, victim partition and address mapping may be fixed at the time of manufacture of a device employing cache operations in accordance with the present description. Thus, one or more of the replacement policy, victim partition and address mapping may be permanently enabled or disabled at the time of manufacture of a device employing cache operations in accordance with the present description.

Figure 4:
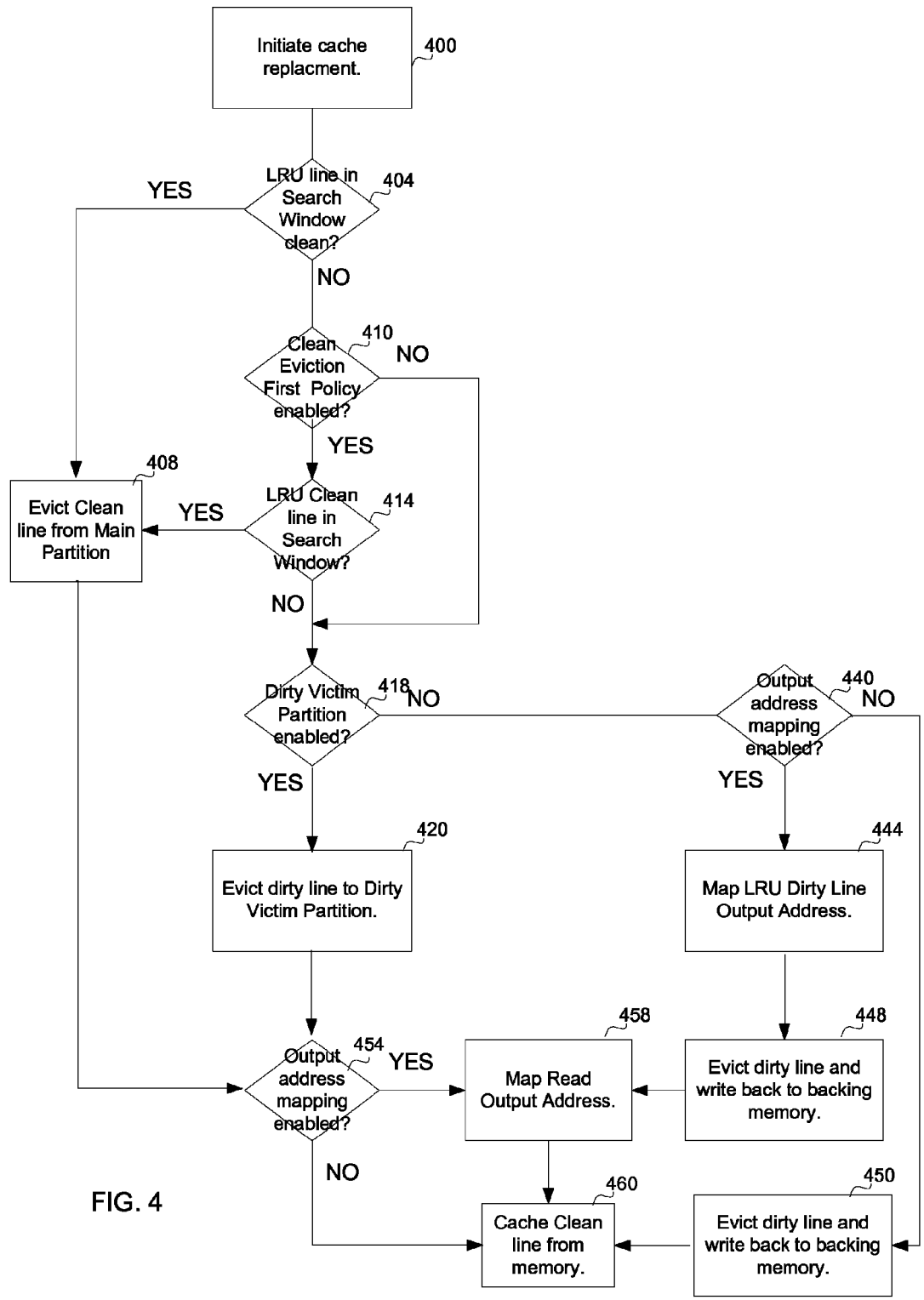
FIG. 4 depicts one embodiment of cache operations for memory management in accordance with one aspect of the present description.
Figure 5A:
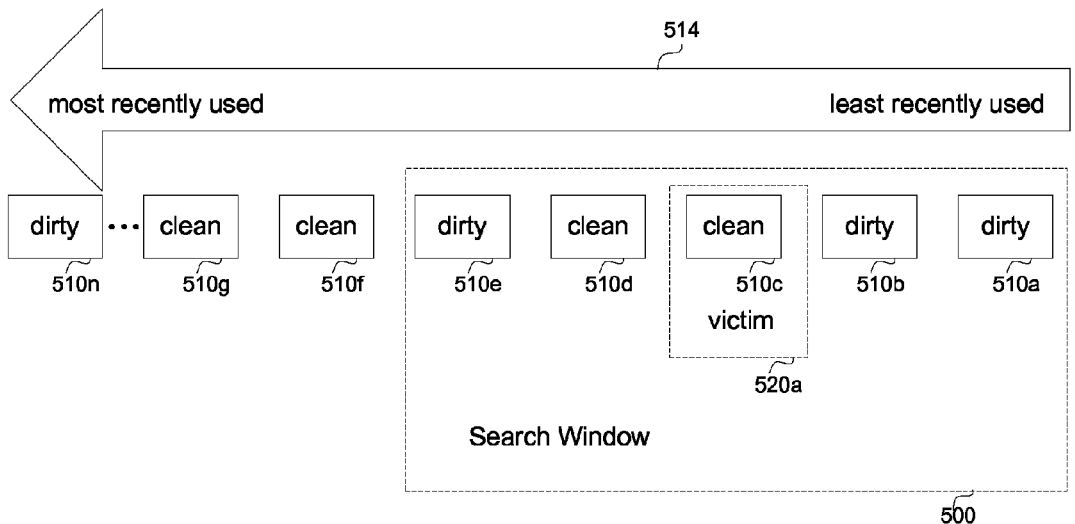
FIGS. 5a and 5b depict alternative replacement policies which may be selectively employed by a memory-sided cache in accordance with the present description in response to monitored conditions.

FIG. 4 depicts an example of cache replacement operations of a memory-sided cache 110 in which one or more of the write filtering policies such as the clean eviction first policy, and the victim cache partition policy, and the wear leveling policies such as the address translation policy, have been enabled or disabled in various combinations, either permanently when manufactured or temporarily in response to monitored device operations. In the illustrated embodiment alternative replacement policies include a least recently used (LRU) replacement policy and a clean eviction first policy based upon a least recently used policy. Accordingly, upon initiation (block 400) of cache replacement operations, a determination is made (block 404) as to whether the least recently used (LRU) cache line in a cache replacement search window 500 (FIG. 5a) is clean. FIG. 5a illustrates one example of an implementation of a clean eviction first policy based upon a least recently used policy. In this example, the clean eviction first policy sorts cache entries as represented by the cache entries 510a-n by the recency of their use if any by the processor core, in which recency of use is represented by the arrow 514. Thus, in this example, the cache entry 510a at the base of the arrow 514 is the least recently used cache entry and the cache entry 510n at the tip of the arrow 514 is the most recently used cache entry.

If it is determined (block 404) that the line of the least recently used cache entry, that is, cache entry 510a, is clean, that clean line of the least recently used cache entry may be evicted (block 408) from the memory-sided cache 110. However, in the example of FIG. 5a, the line of the least recently used cache entry 510a is depicted as dirty. Accordingly, a determination is made (block 410) as to whether the clean eviction first policy such as the clean eviction policy 210 (FIG. 2) has been enabled. If so, a determination is made (block 414) as to whether there is a clean line in the search window 500. In the example of FIG. 5a, the least recently used clean line in the search window 500 is the line of cache entry 510c. Accordingly, with the clean eviction first policy enabled, the least recently used clean line is designated the victim as indicated by the designation 520a and is evicted (block 408) from the memory-sided cache 110.

Figure 5B:
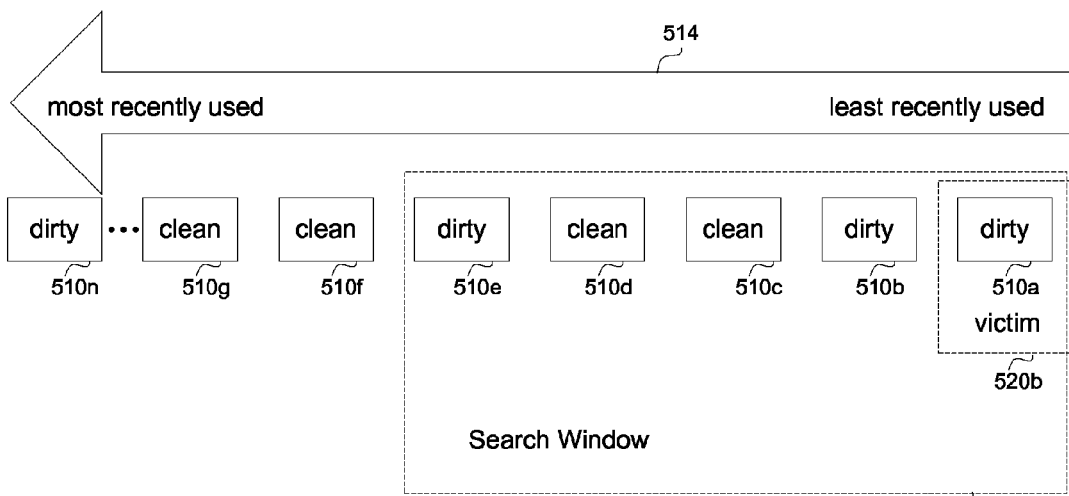

Conversely, if the clean eviction first policy has not been enabled (block 410), (or if it is determined (block 414) that the search window 500 does not contain any clean lines), the least recently used dirty line of cache entry 510a is designated the victim as indicated by the designation 520b in FIG. 5b instead of cache entry 510c in FIG. 5a. FIG. 5b illustrates one example of an implementation of a least recently used policy as an alternative policy which may be selectively enabled as an alternative to a clean eviction first policy.

Upon designation of a dirty line as a victim either because the search window 500 does not contain any clean lines, or because the clean eviction first policy has not been enabled, a determination is made (block 418) as to whether the dirty victim cache partition has been enabled. If so, the least recently used dirty line of cache entry 510a is evicted (block 420) from the main partition 220 (FIG. 2) and transferred to the victim partition 224.

If the dirty victim partition has not been enabled (block 418), a determination (block 440) is made as to whether output address mapping of output address mapping logic 244 (FIG. 2) has been enabled. If so, the address of the dirty line of the least recently used cache entry 510a may be mapped (block 444) (or remapped) by the output address mapping logic 244 (FIG. 2) and the dirty line of the least recently used cache entry 510a may be evicted (block 448) from the memory-sided cache 110 and written back to the byte-addressable non-volatile memory 108. As a result of the output address mapping (block 444), the write backs may be distributed more evenly throughout the full address space of the byte-addressable non-volatile memory 108 to more evenly distribute the wear of write backs amongst the memory locations of the byte-addressable non-volatile memory 108. If output address mapping has not been enabled (block 440), the dirty line of the least recently used cache entry 510a may be evicted (block 450) from the memory-sided cache 110 and written back to the byte-addressable non-volatile memory 108 without output address mapping.

By evicting either a clean line (block 408) or a dirty line (block 448, 450) from the memory-sided cache 110, the cache memory location previously occupied by the evicted cache line may be occupied by a fresh line of data from the byte-addressable non-volatile memory 108. Accordingly, if output address mapping is enabled (block 440 for dirty line evictions or block 454 for clean line evictions), the memory address of the read request requesting the new line of data from the byte-addressable non-volatile memory 108 may be mapped (block 458) (or remapped if input address mapping is enabled as well) before the new line of data is read from the byte-addressable non-volatile memory 108 and cached (block 460) in the memory-sided cache 110. If output address mapping is not enabled (block 440 for dirty line evictions or block 454 for clean line evictions), the memory address of the read request requesting the new line of data from the byte-addressable non-volatile memory 108 may be applied directly to the byte-addressable non-volatile memory 108 without output address mapping (or remapping) to read the new line of data from the byte-addressable non-volatile memory 108 and caching (block 460) it in the memory-sided cache 110.

In one embodiment, an eviction operation may include each time both an eviction from the main partition and a dirty line eviction from the victim partition. It is believed that such an arrangement may improve caching performance. In another embodiment, an eviction operation frequently may be limited to a dirty line eviction from the main partition improve write traffic reduction.

In the illustrated embodiment, it is believed that, as a general matter, a large search window 500 may facilitate improved reduction of write backs from the memory-sided cache 110 to the byte-addressable non-volatile memory 108. Conversely, it is believed that a large search window for the memory-sided cache 110 does not adversely affect the caching quality of the memory-sided cache 110 to a significant degree, in terms of cache hits versus cache misses. The search window size (SWS) refers to the cache associativity (number of ways per cache set). It is believed that a SWS of at least 50% of all cache ways is beneficial for good write traffic reduction.

Figure 6:
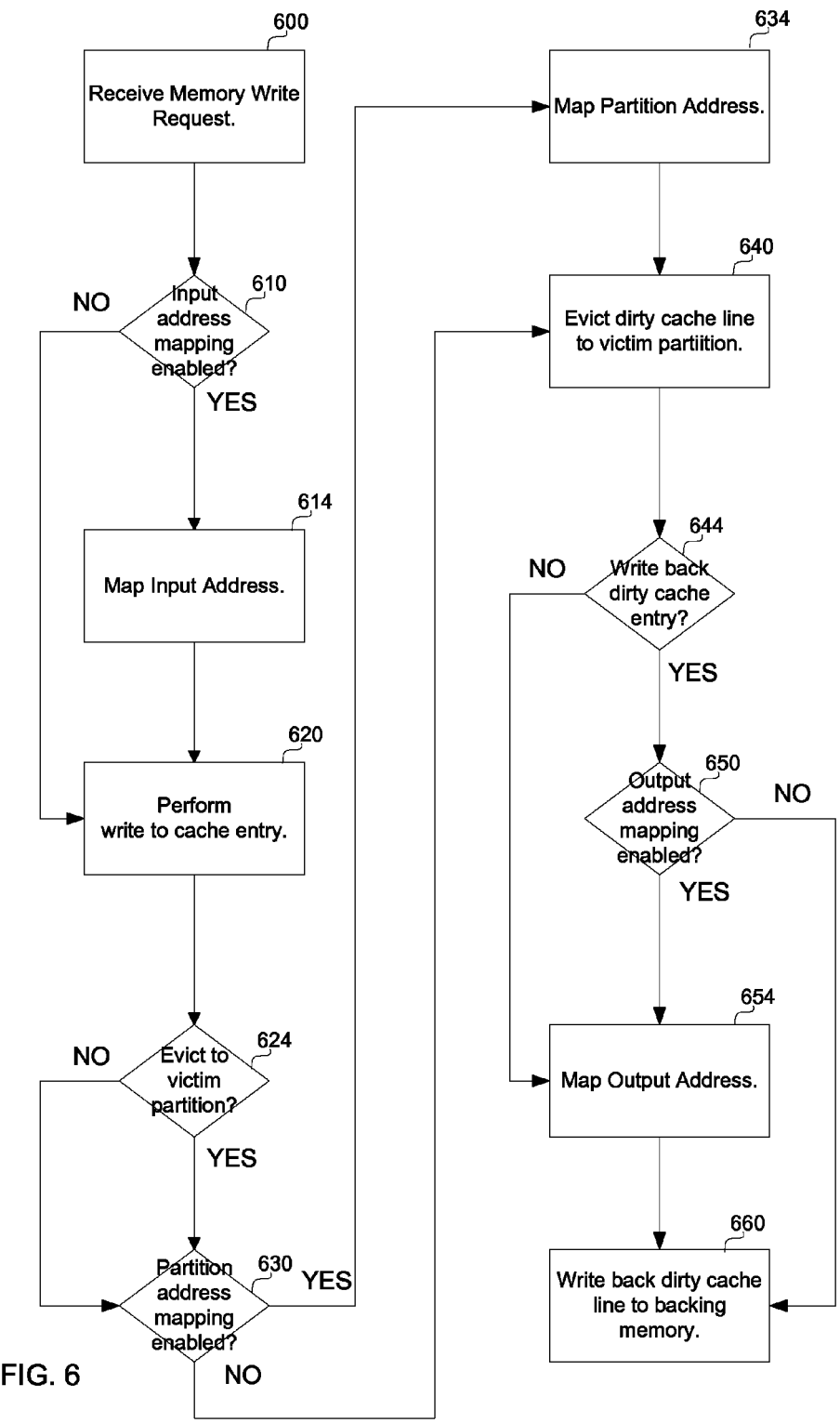
FIG. 6 depicts one embodiment of multi-level address translation operations in accordance with one aspect of the present description.

In another aspect of the present description, multi-level address translation may be realized by address translation at multiple locations along the path of memory operations. Thus, address translation may be provided at both the input and the output of a memory element such as the memory-sided cache, for example. It is appreciated that such address translation may also be provided between partitions. It is believed that multi-level address translation in accordance with the present description may enhance spreading of write back operations over the full available address space to reduce pressure on wear leveling algorithms for the byte-addressable non-volatile memory and also reduce or eliminate vulnerability to certain malicious attacks on the limited endurance of the byte-addressable non-volatile memory. FIG. 6 shows one embodiment of multi-level addressing translation in accordance with the present description. In a first operation, a memory I/O operation such as a memory write request, for example, is received (block 600). If address input mapping is enabled (block 610), the address of the memory location is mapped (block 614) by input address mapping logic such as the logic 240 of FIG. 2, and the write operation is performed (block 620) to the cache entry of the memory-sided cache 110 identified by the mapped input address. If address input mapping is not enabled, the write operation is performed (block 620) to the cache entry of the memory-sided cache 110 identified by the unmodified input address.

Figure 7A:
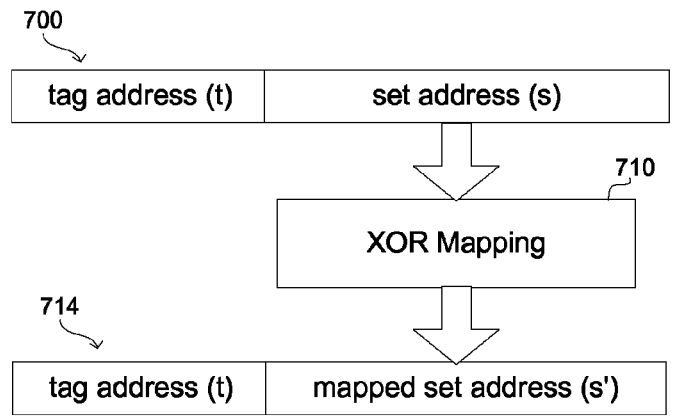
FIGS. 7a-7c depict one embodiment of exclusive-OR based multi-level address translation operations in accordance with one aspect of the present description.
Figure 8A:
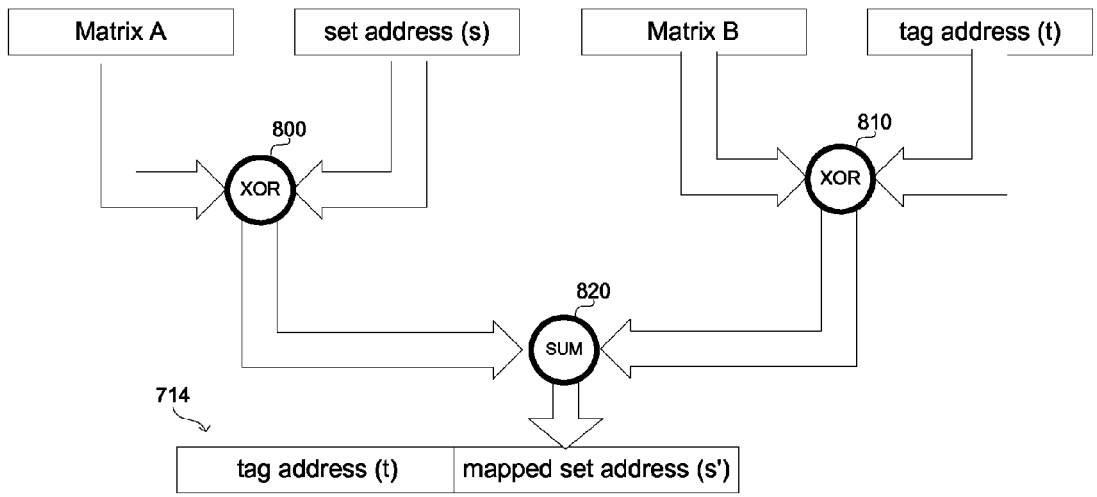
FIGS. 8a-8c depict a more detailed example of exclusive-OR based multi-level address translation operations in accordance with one aspect of the present description.

In one embodiment, address mapping is based upon an exclusive-OR (XOR) mapping function. It is believed that any computational overhead imposed by such a function may be minimal, depending upon the particular application. For example, as shown in FIG. 7a, the original address 700 of the requested memory operation (block 600, FIG. 6) may be divided into a tag address (t) and a set address (s). For example, in some embodiments, tag address (t) may represent the requested memory location and the set address (t) may represent a memory location of the memory-sided cache 110 which is associated with the requested memory location. In this embodiment, the exclusive-OR mapping function 710 modifies the set address (s), and the tag address (t) remains unmodified. The mapped set address (s') is generated by the exclusive-OR mapping function 710 which is depicted in FIG. 8 as follows:

$$s' = A*s + B*t$$

where the mapped set address (s') is the result of a series of operations including exclusive-ORing (function 800) the input set address (s) with a fixed matrix A, exclusive-ORing (function 810) the input tag address (t) with a fixed matrix B, and adding (function 820) these immediate results to each other to provide the mapped set address (s') which is concatentated to the unmodified tag address (t) to provide the mapped memory address 714. In the illustrated embodiment, matrix A and matrix B are fixed strings of bits corresponding in number to the number of bits of the set address (s) and tag address (t), respectively. It is appreciated that in other embodiments other types of numbers, numerical and logical operations and mapping functions may be used, depending upon the particular application.

Figure 7B:
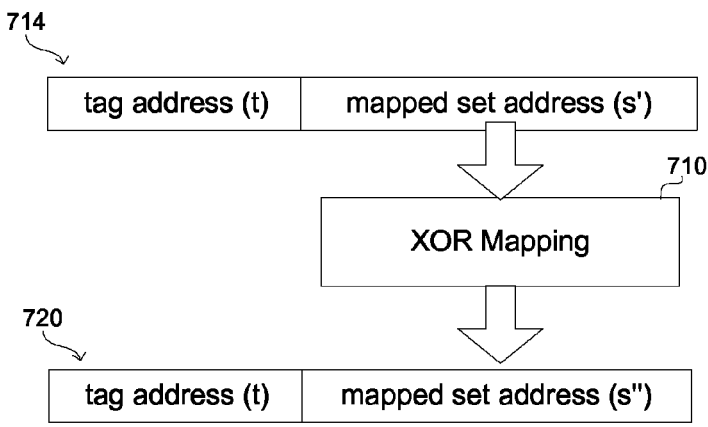

In accordance with the replacement policy implemented by the memory-sided cache 110, the dirty cache entry at the mapped memory address 714 mapped by the input address mapping logic 240 (FIG. 2) may be subject (block 624, FIG. 6) to being evicted to the dirty victim partition 224 (FIG. 2). If so, and if dirty partition mapping has been enabled (block 630), the memory address 714 may be mapped (block 634) again, that is, re-mapped by intra-partition address mapping logic 260 (FIG. 2) to a remapped address 720 as shown in FIG. 7b. In the illustrated embodiment, the mapping logic 260, like the mapping logic 240 includes mapping logic 710 as shown in FIG. 7b.

Figure 8B:
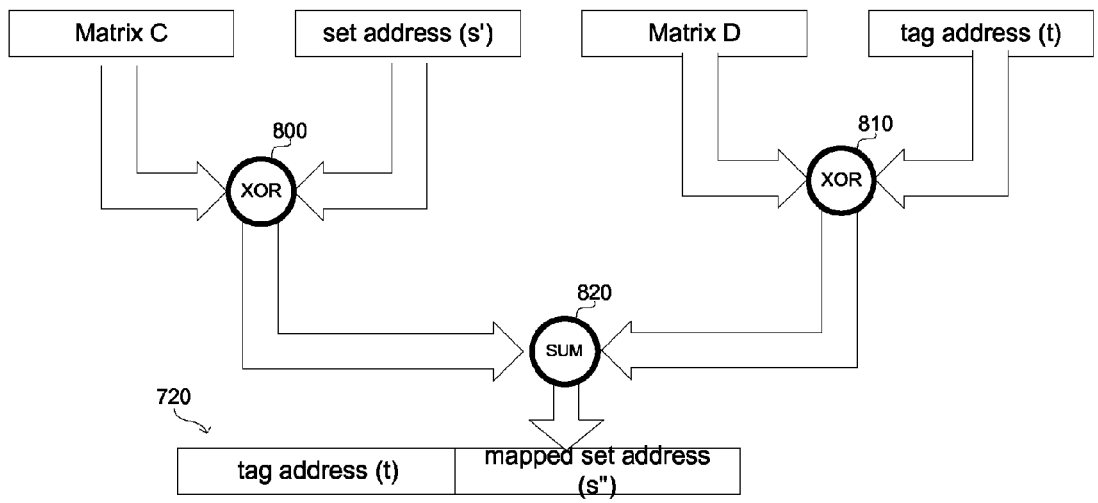

Accordingly, the exclusive-OR mapping function modifies the set address (s') and the tag address (t) remains unmodified. As shown in FIG. 8b, the re-mapped set address (s") is generated by the exclusive-OR mapping function in a manner similar to that depicted in FIG. 8a as follows:

$$s'' = C*s' + D*t$$

where the remapped set address (s") is the result of a series of operations including exclusive-ORing (function 800, FIG. 8b) the input set address (s') with a fixed matrix C, exclusive-ORing (function 810) the input tag address (t) with a fixed matrix D, and adding (function 820) these immediate results to each other to provide the remapped set address (s") which is concatentated to the unmodified tag address (t) to provide the re-mapped memory address 720. The dirty victim cache entry may then be evicted (block 640) to the dirty victim partition 224 (FIG. 2) at the cache entry location identified by the re-mapped set address (s") and tag (t). If intra-partition address mapping is not enabled, the dirty cache entry may be evicted (block 640) to the dirty victim partition 224 (FIG. 2) at the cache entry location identified by the mapped set address (s') if input address mapping was enabled or at the dirty victim partition memory location identified by the unmapped set address (s) if input address mapping was not enabled.

Figure 7C:
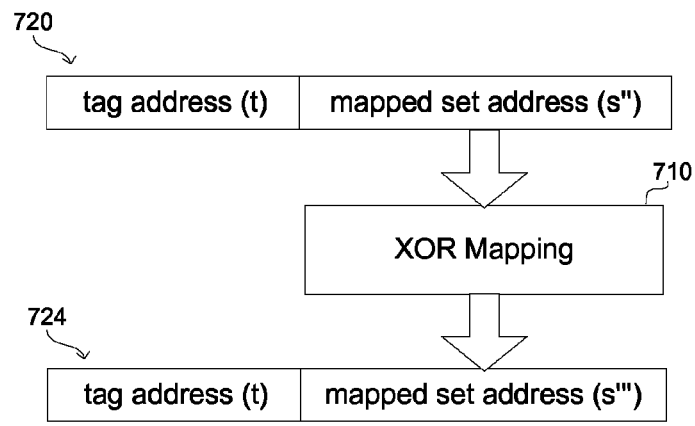

In accordance with the replacement policy implemented by the memory-sided cache 110, the dirty cache entry at the remapped memory address 720 remapped by the intra-partition address mapping logic 260 (FIG. 2) may be subject to being evicted (block 644, FIG. 6) from to the dirty victim partition 224 (FIG. 2) and written back to the byte-addressable non-volatile memory 108. If so, and if output address mapping has been enabled (block 650), the memory address 720 may be mapped (block 654) again, that is, re-mapped by mapping logic 710 to a remapped address 724 as shown in FIG. 7c.

Figure 8C:
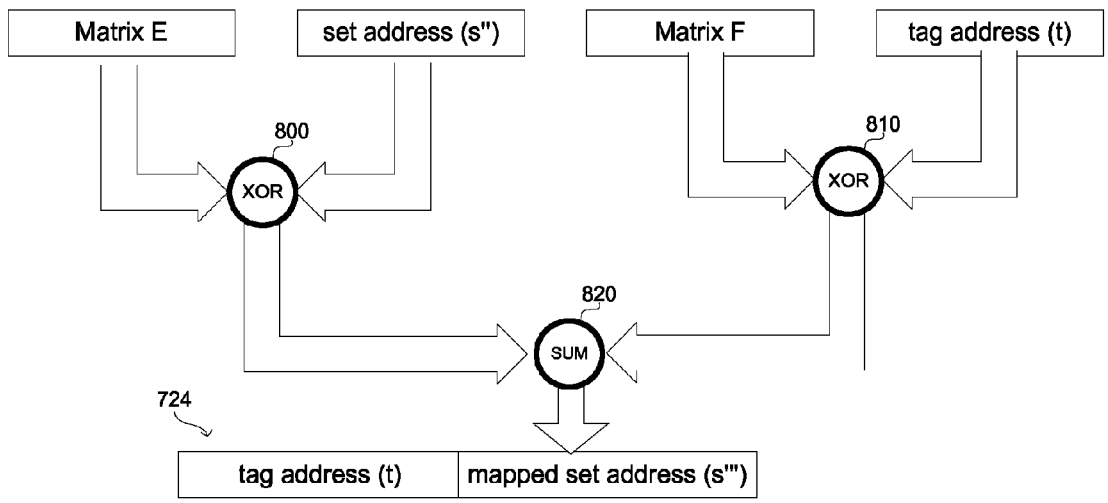

Accordingly, the exclusive-OR mapping function 710 modifies the set address (s″) and the tag address (t) remains unmodified. As shown in FIG. 8c, the re-mapped set address (s‴) is generated by the exclusive-OR mapping function in a manner similar to that depicted in FIG. 8a as follows:

$$s''' = E*s'' + F*t$$

where the mapped set address (s‴) is the result of a series of operations including exclusive-ORing (function 800, FIG. 8c) the input set address (s″) with a fixed matrix E, exclusive-ORing (function 810) the input tag address (t) with a fixed matrix F, and adding (function 820) these immediate results to each other to provide the mapped set address (s‴) which is concatentated to the unmodified tag address (t) to provide the re-mapped memory address 724. The dirty victim cache entry may then be evicted and written back (block 660) to the byte-addressable non-volatile memory 108 at the memory location identified by the re-mapped set address (s‴) and tag (t). If output address mapping is not enabled, the dirty cache entry may be written back (block 660) to the byte-addressable non-volatile memory 108 (FIG. 2) at the memory location identified by the remapped set address (s″) and tag (t) if intra-partition address mapping and input address mapping were enabled, or to the byte-addressable non-volatile memory 108 (FIG. 2) at the memory location identified by the mapped set address (s′) and tag (t) if input address mapping was enabled or to the byte-addressable non-volatile memory 108 (FIG. 2) at the memory location identified by the unmapped set address (s) and tag (t) if input address mapping was not enabled.

In the illustrated embodiment, the memory-sided cache 110 includes logic for performing various operations as described above. This logic including for example, the eviction logic 200, device monitoring and policy selection logic 250, the input address mapping logic 240, intra-partition address mapping logic 260 and the output address mapping logic 244, may be implemented in one or more controllers which include one or more of hardware, software, firmware and various combinations thereof.

Figure 9:
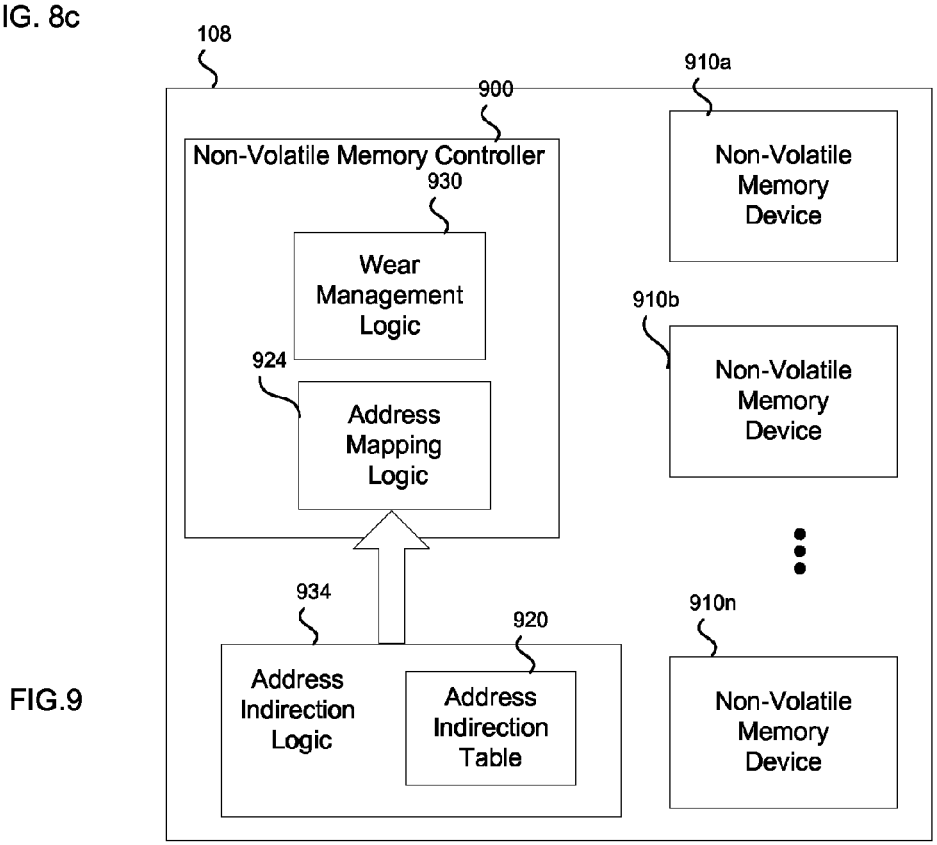
FIG. 9 is a schematic diagram of one embodiment of a byte-addressable non-volatile memory of the memory hierarchy of FIG. 1.

FIG. 9 shows one example of a backing memory 108 for use in the memory hierarchy of FIG. 1. The backing memory 108 includes a 3D cross point memory backing memory controller 900 and a set of 3D cross point memory backing memory modules 910a-n. In one embodiment, a single pool of 3D cross point memory backing memory 530a-i may be dynamically shared between system memory and storage usages.

System memory as used herein is memory which is visible to and/or directly addressable by software executed on the processor core 104; while the cache memories 110, 120-130 may operate transparently to the software in the sense that they do not form a directly-addressable portion of the system address space, but the cores may also support execution of instructions to allow software to provide some control (configuration, policies, hints, etc.) to some or all of the cache(s). The subdivision of system memory into regions may be performed manually as part of a system configuration process (e.g., by a system designer) and/or may be performed automatically by software.

In this embodiment, the entire 3D cross point memory pool 530a-i may be subdivided into "blocks" of 4 KB size, for example, and a table may be used to exclude bad blocks and provide spare blocks for wearing-leveling operations. In addition, the table may also include the mapping of each block to a "logical" block address used by software.

An Address Indirection Table (AIT) 920 may be updated whenever a block is moved due to wear leveling. When this happens the logical block address used by software may be mapped to a different 3D cross point memory Device Address (PDA). In one embodiment, this mapping is stored in the AIT and is updated on every wear-level move. It is believed that address translation at the cache level in accordance with the present description may permit a relaxation or reduction in wear leveling operations within the NVRAM itself.

As illustrated, the 3D cross point memory controller 900 includes address mapping logic 924 to map a system address (which may have been previously mapped by the memory-sided cache 110 as discussed above) in response to a wear management unit 930 and an address indirection unit 934 to map system addresses to 3D cross point memory blocks. In one embodiment, the wear management logic 930 implements a wear leveling algorithm to account for the fact that the storage cells of the 3D cross point memory 910a-n begin to wear out after too many write and/or erase accesses. Wear leveling spreads writes and erases across the 3D cross point memory device's memory cells by, for example, forcing data blocks with low cycle counts to occasionally move, and thereby allowing high cycled data blocks to be placed in memory cells that stored the low cycled data blocks. Typically, the majority of blocks do not cycle, but high cycle count blocks are most likely to fail and wear leveling swaps addresses of high cycle count blocks with low cycle count blocks. The wear management logic 930 may track the cycle counts using one or more counters and registers (e.g., the counters may increment by one each time a cycle is detected and the result may be stored in the set of registers). In one embodiment, the address indirection logic 934 includes an address indirection table (AIT) 920 containing an indication of the 3D cross point memory blocks to which write operations should be directed. The AIT may be used to automatically move blocks between memory and storage usages. From the software perspective, the accesses to all the blocks uses traditional memory load/store semantics (i.e., wear leveling and address indirection operations occur transparently to software). In one embodiment, AIT is used to translate the system address that is generated by software to a PDA. This translation facilitates uniformly wearing the 3D cross point memory devices. As a result, the data will move around in PDA space to avoid any hotspots. When such a move occurs, the relationship between the system address space and PDA will change and the AIT will be updated to reflect this new translation.

EXAMPLES

The following examples pertain to further embodiments.

Example 1 is a device for use with a byte-addressable non-volatile memory having memory locations, comprising:

a cache having a cache memory and a plurality of cache entries, and adapted to cache data from memory locations in the byte-addressable non-volatile memory in cache entries of the cache memory, wherein the cache memory has at least one of a primary cache memory and both a primary cache memory and a victim cache memory and wherein the cache has at least two controllers of a first operation controller for performing a first operation, a second operation controller for performing a second operation, and a third operation controller for performing a third operation, wherein the first operation controller includes logic for performing a first operation including evicting victim cache entries from the cache memory in accordance with a replacement policy which is biased to evict cache entries having clean cache lines over evicting cache entries having dirty cache lines, wherein the second operation controller includes logic for performing a second operation including evicting victim cache entries from the primary cache memory to the victim cache memory of the cache memory, and wherein the third operation controller includes logic for performing a third operation including accessing cache entries of the cache memory based upon addresses of memory locations, the cache entry accessing including translating the memory location addresses to spread the memory location addresses within an address range of the byte-addressable non-volatile memory.

In Example 2, the subject matter of Example 1, can optionally include wherein the cache has all three of the first operation controller, the second operation controller, and the third operation controller.

In Example 3, the subject matter of Example 1, can optionally include wherein the victim cache entries cached in the victim cache memory are exclusively cache entries having dirty cache lines.

In Example 4, the subject matter of Example 3, can optionally include monitoring logic for monitoring operations of the device and selectively enabling and disabling at least one of the first, second and third operations as a function of the monitored operations.

In Example 5, the subject matter of Example 1, can optionally include wherein the cache has the second operation controller, the device further comprising a controller having logic for evicting cache lines having dirty cache lines from the victim cache memory, and writing the dirty cache lines of cache lines evicted from the dirty cache memory back to the byte-addressable non-volatile memory.

In Example 6, the subject matter of Example 1, can optionally include wherein the third operation controller logic for translating the memory location addresses includes logic implementing an exclusive-or function for shuffling memory location addresses to spread the memory location addresses within an address range of the byte-addressable non-volatile memory.

In Example 7, the subject matter of Example 1, can optionally include logic for selectively enabling and disabling at least one of the first operation controller, the second operation controller and the third operation controller as the device boots to configure the cache memory as the device boots.

In Example 8, the subject matter of Example 1, can optionally include wherein the third operation controller includes logic for multi-level address translating which includes performing the third operation at at least two of the input of the cache memory, the output of the cache memory and between the primary cache memory and the victim cache memory of the cache memory.

In Example 9, the subject matter of any one of Examples 1-7, can optionally include wherein the third operation controller includes logic for multi-level address translating which includes performing the third operation at at least two of the input of the cache memory, the output of the cache memory and between the primary cache memory and the victim cache memory of the cache memory.

Example 10 is a device as substantially described herein with reference to and as illustrated by the accompanying drawings.

Example 11 is a method for cache operations, comprising:
caching data from memory locations in a byte-addressable non-volatile memory in cache entries of a cache memory which includes a primary cache memory; and performing at least two of a first operation, a second operation and a third operation, wherein the first operation includes evicting victim cache entries from the cache memory in accordance with a replacement policy which is biased to evict cache entries having clean cache lines over evicting cache entries having dirty cache lines, wherein the second operation includes evicting victim cache entries from the primary cache memory to a victim cache memory of the cache memory, and wherein the third operation includes accessing cache entries of the cache memory based upon addresses of memory locations, the cache entry accessing including translating the memory location addresses to spread the memory location addresses within an address range of the byte-addressable non-volatile memory.

In Example 12, the subject matter of Example 11, can optionally include wherein said performing at least two of the first operation, the second operation and the third operation, includes performing all three of the first operation, second operation and the third operation.

In Example 13, the subject matter of Example 11, can optionally include wherein the victim cache entries cached in the victim cache memory are exclusively cache entries having dirty cache lines.

In Example 14, the subject matter of Example 13, can optionally include selectively enabling and disabling at least one of the first operation, the second operation and the third operation as the system boots to configure the cache memory as the system boots.

In Example 15, the subject matter of Example 11, can optionally include wherein the operations performed include performing the second operation, the method further comprising evicting cache lines having dirty cache lines from the victim cache memory, and writing the dirty cache lines of cache lines evicted from the dirty cache memory back to the byte-addressable non-volatile memory.

In Example 16, the subject matter of Example 11, can optionally include wherein the translating the memory location addresses includes shuffling memory location addresses using an exclusive-or function to spread the memory location addresses within an address range of the byte-addressable non-volatile memory.

In Example 17, the subject matter of Example 11, can optionally include monitoring operations of a device having the cache memory and selectively enabling and disabling at least one of the first, second and third operations as a function of the monitored operations.

In Example 18, the subject matter of Example 11 can optionally include multi-level address translating which includes performing the third operation at at least two of the input of the cache memory, the output of the cache memory and between partitions of the cache memory.

In Example 19, the subject matter of any one of Examples 11-17 can optionally include multi-level address translating which includes performing the third operation at at least two of the input of the cache memory, the output of the cache memory and between partitions of the cache memory.

Example 20 is an apparatus comprising means to perform a method as set forth in any preceding Example.

Example 21 is a machine-readable storage including machine-readable instructions, when executed, to implement a method or realize an apparatus as set forth in any preceding Example.

Example 22 is a method as substantially described herein with reference to and as illustrated by the accompanying drawings.

Example 23 is a system adapted for cache operations, comprising:

a processor;

a video display coupled to the output of the processor;

a byte-addressable non-volatile memory having memory locations;

a cache coupled to the processor and the byte-addressable non-volatile memory, the cache having a cache memory and a plurality of cache entries, and adapted to cache data from memory locations in the byte-addressable non-volatile memory in cache entries of the cache memory, wherein the cache memory has at least one of a primary cache memory and both a primary cache memory and a victim cache memory and wherein the cache has at least two controllers of a first operation controller for performing a first operation, a second operation controller for performing a second operation, and a third operation controller for performing a third operation, wherein the first operation controller includes logic for performing a first operation including evicting victim cache entries from the cache memory in accordance with a replacement policy which is biased to evict cache entries having clean cache lines over evicting cache entries having dirty cache lines, wherein the second operation controller includes logic for performing a second operation including evicting victim cache entries from the primary cache memory to the victim cache memory of the cache memory, and wherein the third operation controller includes logic for performing a third operation including accessing cache entries of the cache memory based upon addresses of memory locations, the cache entry accessing including translating the memory location addresses to spread the memory location addresses within an address range of the byte-addressable non-volatile memory.

In Example 24, the subject matter of Example 23, can optionally include wherein the cache has all three of the first operation controller, the second operation controller, and the third operation controller.

In Example 25, the subject matter of Example 23, can optionally include wherein the victim cache entries cached in the victim cache memory are exclusively cache entries having dirty cache lines.

In Example 26, the subject matter of Example 25, can optionally include monitoring logic for monitoring operations of the system and selectively enabling and disabling at least one of the first, second and third operation controllers as a function of the monitored operations.

In Example 27, the subject matter of Example 23, can optionally include wherein the cache has the second operation controller, the cache further comprising a controller having logic for evicting cache lines having dirty cache lines from the victim cache memory, and writing the dirty cache lines of cache lines evicted from the dirty cache memory back to the byte-addressable non-volatile memory.

In Example 28, the subject matter of Example 23, can optionally include wherein the third operation controller logic for translating the memory location addresses includes logic implementing an exclusive-or function for shuffling memory location addresses to spread the memory location addresses within an address range of the byte-addressable non-volatile memory.

In Example 29, the subject matter of Example 23 can optionally include logic for selectively enabling and disabling at least one of the first operation controller, the second operation controller and the third operation controller as the system boots to configure the cache memory as the system boots.

In Example 30, the subject matter of Example 23, can optionally include wherein the third operation controller includes logic for multi-level address translating which includes performing the third operation at at least two of the input of the cache memory, the output of the cache memory and between the primary cache memory and the victim cache memory of the cache memory.

In Example 31, the subject matter of any one of Examples 23-29, can optionally include wherein the third operation controller includes logic for multi-level address translating which includes performing the third operation at at least two of the input of the cache memory, the output of the cache memory and between the primary cache memory and the victim cache memory of the cache memory.

Example 32 is a system as substantially described herein with reference to and as illustrated by the accompanying drawings.

Example 33 is a device for use with a byte-addressable non-volatile memory having memory locations, comprising:

cache means having a cache memory and a plurality of cache entries, for caching data from memory locations in the byte-addressable non-volatile memory in cache entries of the cache memory, wherein the cache memory has at least one of a primary cache memory and both a primary cache memory and a victim cache memory and wherein the cache has at least two controllers of a first operation controller, a second operation controller, and a third operation controller, wherein the first operation controller includes logic means for performing a first operation including evicting victim cache entries from the cache memory in accordance with a replacement policy which is biased to evict cache entries having clean cache lines over evicting cache entries having dirty cache lines, wherein the second operation controller includes logic means for performing a second operation including evicting victim cache entries from the primary cache memory to the victim cache memory of the cache memory, and wherein the third operation controller includes logic means for performing a third operation including accessing cache entries of the cache memory based upon addresses of memory locations, the cache entry accessing including translating the memory location addresses to spread the memory location addresses within an address range of the byte-addressable non-volatile memory.

In Example 34, the subject matter of Example 33, can optionally include wherein the cache has all three of the first operation controller, the second operation controller, and the third operation controller.

In Example 35, the subject matter of Example 33, can optionally include wherein the victim cache entries cached in the victim cache memory are exclusively cache entries having dirty cache lines.

In Example 36, the subject matter of Example 35, can optionally include monitoring means for monitoring operations of the device and for selectively enabling and disabling at least one of the first, second and third operation controllers as a function of the monitored operations.

In Example 37, the subject matter of Example 33, can optionally include wherein the cache has the second operation controller, the device further comprising a controller having logic means for evicting cache lines having dirty cache lines from the victim cache memory, and for writing the dirty cache lines of cache lines evicted from the dirty cache memory back to the byte-addressable non-volatile memory.

In Example 38, the subject matter of Example 33, can optionally include wherein the third operation controller logic for translating the memory location addresses includes logic means implementing an exclusive-or function for shuffling memory location addresses to spread the memory location addresses within an address range of the byte-addressable non-volatile memory.

In Example 39, the subject matter of Example 33 can optionally include logic means for selectively enabling and disabling at least one of the first operation controller, the second operation controller and the third operation controller as the device boots to configure the cache memory as the device boots.

In Example 40, the subject matter of Example 33, can optionally include wherein the third operation controller includes logic means for multi-level address translating which includes performing the third operation at at least two of the input of the cache memory, the output of the cache memory and between the primary cache memory and the victim cache memory of the cache memory.

In Example 41, the subject matter of any one of Examples 33-40, can optionally include wherein the third operation controller includes logic means for multi-level address translating which includes performing the third operation at at least two of the input of the cache memory, the output of the cache memory and between the primary cache memory and the victim cache memory of the cache memory.

Example 42 is a computer program product, comprising a computer readable storage medium having computer readable program code embodied therein that executes to communicate with a byte-addressable non-volatile memory and a cache memory having at least one of a primary cache memory and both a primary cache memory and a victim cache memory, and to perform operations, the operations comprising:

caching data from memory locations in a byte-addressable non-volatile memory in cache entries of a cache memory which includes a primary cache memory; and performing at least two of a first operation, a second operation and a third operation, wherein the first operation includes evicting victim cache entries from the cache memory in accordance with a replacement policy which is biased to evict cache entries having clean cache lines over evicting cache entries having dirty cache lines, wherein the second operation includes evicting victim cache entries from the primary cache memory to a victim cache memory of the cache memory, and wherein the third operation includes accessing cache entries of the cache memory based upon addresses of memory locations, the cache entry accessing including translating the memory location addresses to spread the memory location addresses within an address range of the byte-addressable non-volatile memory.

In Example 43, the subject matter of Example 42, can optionally include wherein said performing at least two of the first operation, the second operation and the third operation, includes performing all three of the first operation, second operation and the third operation.

In Example 44, the subject matter of Example 42, can optionally include wherein the victim cache entries cached in the victim cache memory are exclusively cache entries having dirty cache lines.

In Example 45, the subject matter of Example 44, can optionally include selectively enabling and disabling at least one of the first operation, the second operation and the third operation as the system boots to configure the cache memory as the system boots.

In Example 46, the subject matter of Example 42, can optionally include wherein the operations performed include performing the second operation, the operations further comprising evicting cache lines having dirty cache lines from the victim cache memory, and writing the dirty cache lines of cache lines evicted from the dirty cache memory back to the byte-addressable non-volatile memory.

In Example 47, the subject matter of Example 42, can optionally include wherein the translating the memory location addresses includes shuffling memory location addresses using an exclusive-or function to spread the memory location addresses within an address range of the byte-addressable non-volatile memory.

In Example 48, the subject matter of Example 42, can optionally include wherein the operations further comprise monitoring operations of a device having the cache memory and selectively enabling and disabling at least one of the first, second and third operations as a function of the monitored operations.

In Example 49, the subject matter of Example 42, can optionally include wherein the operations further comprise multi-level address translating which includes performing the third operation at at least two of the input of the cache memory, the output of the cache memory and between partitions of the cache memory.

In Example 50, the subject matter of any one of Examples 42-49, can optionally include wherein the operations further comprise multi-level address translating which includes performing the third operation at at least two of the input of the cache memory, the output of the cache memory and between partitions of the cache memory.

Example 51 is a computer program product as substantially described herein with reference to and as illustrated by the accompanying drawings.

In Example 52, the subject matter of Example 11, can optionally include wherein the victim cache entries cached in the victim cache memory are exclusively cache entries having dirty cache line, wherein the operations performed include performing the second operation, the method further comprising evicting cache lines having dirty cache lines from the victim cache memory, and writing the dirty cache lines of cache lines evicted from the dirty cache memory back to the byte-addressable non-volatile memory, wherein the translating the memory location addresses includes shuffling memory location addresses using an exclusive-or function to spread the memory location addresses within an address range of the byte-addressable non-volatile memory, and wherein the method further comprises monitoring operations of a device having the cache memory and selectively enabling and disabling at least one of the first, second and third operations as a function of the monitored operations.

In Example 53, the subject matter of Example 23, can optionally include wherein the victim cache entries cached in the victim cache memory are exclusively cache entries having dirty cache lines, wherein the cache has the second operation controller, the cache further comprising a controller having logic for evicting cache lines having dirty cache lines from the victim cache memory, and writing the dirty cache lines of cache lines evicted from the dirty cache memory back to the byte-addressable non-volatile memory, wherein the third operation controller logic for translating the memory location addresses includes logic implementing an exclusive-or function for shuffling memory location addresses to spread the memory location addresses within an address range of the byte-addressable non-volatile memory, and wherein the system of further comprises logic for selectively enabling and disabling at least one of the first operation controller, the second operation controller and the third operation controller as the system boots to configure the cache memory as the system boots.

In Example 54, the subject matter of Example 33, can optionally include wherein the victim cache entries cached in the victim cache memory are exclusively cache entries having dirty cache lines, wherein the cache has the second operation controller, the device further comprising a controller having logic means for evicting cache lines having dirty cache lines from the victim cache memory, and for writing the dirty cache lines of cache lines evicted from the dirty cache memory back to the byte-addressable non-volatile memory, wherein the third operation controller logic for translating the memory location addresses includes logic means implementing an exclusive-or function for shuffling memory location addresses to spread the memory location addresses within an address range of the byte-addressable non-volatile memory, wherein the device further comprises logic means for selectively enabling and disabling at least one of the first operation controller, the second operation controller and the third operation controller as the device boots to configure the cache memory as the device boots, and wherein the third operation controller includes logic means for multi-level address translating which includes performing the third operation at at least two of the input of the cache memory, the output of the cache memory and between the primary cache memory and the victim cache memory of the cache memory.

In Example 55, the subject matter of Example 42, can optionally include wherein the victim cache entries cached in the victim cache memory are exclusively cache entries having dirty cache lines, wherein the operations performed include performing the second operation, the operations further comprising evicting cache lines having dirty cache lines from the victim cache memory, and writing the dirty cache lines of cache lines evicted from the dirty cache memory back to the byte-addressable non-volatile memory, wherein the translating the memory location addresses includes shuffling memory location addresses using an exclusive-or function to spread the memory location addresses within an address range of the byte-addressable non-volatile memory, wherein the operations further comprise comprising monitoring operations of a device having the cache memory and selectively enabling and disabling at least one of the first, second and third operations as a function of the monitored operations, and wherein the operations further comprise multi-level address translating which includes performing the third operation at at least two of the input of the cache memory, the output of the cache memory and between partitions of the cache memory.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 10:
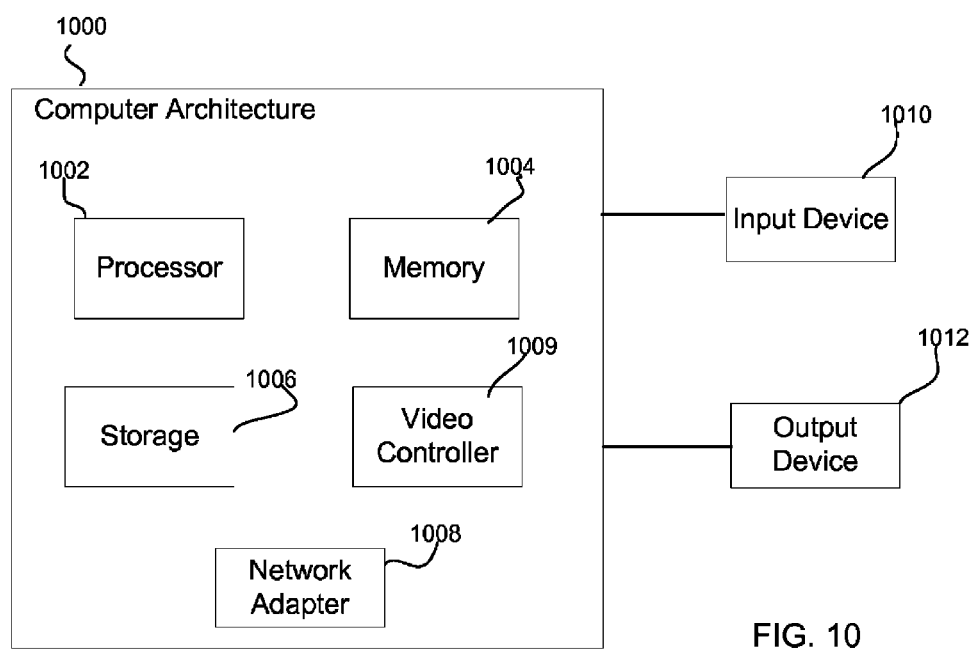
FIG. 10 is a schematic diagram of one example of a computer architecture employing cache operations for memory management in accordance with one aspect of the present description.

FIG. 10 illustrates one embodiment of a computer architecture 1000 of a memory hierarchy such as the memory hierarchy 100 of FIG. 1 having a memory-sided cache in accordance with the present description. The computer architecture 1000 may comprise any computing device known in the art, such as a mainframe, server, personal computer, workstation, laptop, handheld computer, telephony device, network appliance, virtualization device, storage controller, etc. The architecture 1000 may include a processor 1002 (e.g., a microprocessor), a memory 1004 (e.g., a volatile or nonvolatile memory device), and storage 1006 (e.g., a non-volatile storage, such as magnetic disk drives, optical disk drives, a tape drive, etc.). The storage 1006 may comprise an internal storage device or an attached or network accessible storage. Programs in the storage 1006 are loaded into the memory 1004 and executed by the processor 1002 in a manner known in the art. The architecture further includes a network controller or adapter 1008 to enable communication with a network, such as an Ethernet, a Fibre Channel Arbitrated Loop, etc. Further, the architecture may, in certain embodiments, include a video controller 1009 to render information on a display monitor, where the video controller 1009 may be embodied on a video card or integrated on integrated circuit components mounted on the motherboard. An input device 1010 is used to provide user input to the processor 1002, and may include a keyboard, mouse, pen-stylus, microphone, touch sensitive display screen, or any other activation or input mechanism known in the art. An output device 1012 is capable of rendering information transmitted from the processor 1002, or other component, such as a display monitor, printer, storage, etc.

The network adapter 1008 may embodied on a network card, such as a Peripheral Component Interconnect (PCI) card, PCI-express, or some other I/O card, or on integrated circuit components mounted on the motherboard. The storage 1006 may comprise an internal storage device or an attached or network accessible storage. Programs in the storage 1006 are loaded into the memory 1004 and executed by the processor 1002. Any one or more of the devices of the computer architecture 1000 may include one or more integrated circuits having an on-die conversion testing circuit as described herein.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus, comprising:
a cache having a cache memory and a plurality of cache entries, and adapted to cache data from memory locations in a byte-addressable non-volatile memory in cache entries of the cache memory, wherein the cache memory has at least one of a primary cache memory and both a primary cache memory and a victim cache memory and wherein the cache has at least two controllers of a first operation controller for performing a first operation, a second operation controller for performing a second operation, and a third operation controller for performing a third operation,
wherein the first operation controller includes logic for performing a first operation including evicting victim cache entries from the cache memory in accordance with a replacement policy which is biased to evict cache entries having clean cache lines over evicting cache entries having dirty cache lines,
wherein the second operation controller includes logic for performing a second operation including evicting victim cache entries from the primary cache memory to the victim cache memory of the cache memory, and
wherein the third operation controller includes logic for performing a third operation including accessing cache entries of the cache memory based upon addresses of memory locations, the cache entry accessing including translating the memory location addresses to spread the memory location addresses within an address range of the byte-addressable non-volatile memory.

2. The apparatus of claim 1 wherein the cache has all three of the first operation controller, the second operation controller, and the third operation controller.

3. The apparatus of claim 1 wherein the victim cache entries cached in the victim cache memory are exclusively cache entries having dirty cache lines.

4. The apparatus of claim 3 wherein the victim cache memory is at least one fourth the capacity of the primary cache memory.

5. The apparatus of claim 1 wherein the cache has the second operation controller, the apparatus further comprising a controller having logic for evicting cache lines having dirty cache lines from the victim cache memory, and writing the dirty cache lines of cache lines evicted from the dirty cache memory back to the byte addressable non-volatile memory.

6. The apparatus of claim 1 wherein the third operation controller logic for translating the memory location addresses includes logic implementing an exclusive-or function for shuffling memory location addresses to spread the memory location addresses within an address range of the byte addressable non-volatile memory.

7. The apparatus of claim 1 further comprising logic for selectively enabling and disabling at least one of the first operation controller, the second operation controller and the third operation controller as the apparatus boots to configure the cache memory as the apparatus boots.

8. The apparatus of claim 1 wherein the third operation controller includes logic for multi-level address translating which includes performing the third operation at at least two of an input of the cache memory, an output of the cache memory and between the primary cache memory and the victim cache memory of the cache memory.

9. A method, comprising:
caching data from memory locations in a byte addressable non-volatile memory in cache entries of a cache memory which includes a primary cache memory; and
performing at least two of a first operation, a second operation and a third operation,
wherein the first operation includes evicting victim cache entries from the cache memory in accordance with a replacement policy which is biased to evict cache entries having clean cache lines over evicting cache entries having dirty cache lines,
wherein the second operation includes evicting victim cache entries from the primary cache memory to a victim cache memory of the cache memory, and
wherein the third operation includes accessing cache entries of the cache memory based upon addresses of memory locations, the cache entry accessing including translating the memory location addresses to spread the memory location addresses within an address range of the byte addressable non-volatile memory.

10. The method of claim 9 wherein said performing at least two of the first operation, the second operation and the third operation, includes performing all three of the first operation, second operation and the third operation.

11. The method of claim 9 wherein the victim cache entries cached in the victim cache memory are exclusively cache entries having dirty cache lines.

12. The method of claim 11 wherein the victim cache memory is at least one fourth the capacity of the primary cache memory.

13. The method of claim 9 wherein the operations performed include performing the second operation, the method further comprising evicting cache lines having dirty cache lines from the victim cache memory, and writing the dirty cache lines of cache lines evicted from the dirty cache memory back to the byte addressable non-volatile memory.

14. The method of claim 9 wherein the translating the memory location addresses includes shuffling memory location addresses using an exclusive-or function to spread the memory location addresses within an address range of the byte addressable non-volatile memory.

15. The method of claim 9 further comprising monitoring operations of a device having the cache memory and selectively enabling and disabling at least one of the first, second and third operations as a function of the monitored operations.

16. The method of claim 9 further comprising multi-level address translating which includes performing the third operation at at least two of an input of the cache memory, an output of the cache memory and between partitions of the cache memory.

17. A system, comprising:
a processor;
a video controller coupled to the output of the processor;
a byte addressable non-volatile memory having memory locations; and
a cache coupled to the processor and the byte addressable non-volatile memory, the cache having a cache memory and a plurality of cache entries, and adapted to cache data from memory locations in the byte addressable non-volatile memory in cache entries of the cache memory, wherein the cache memory has at least one of a primary cache memory and a victim cache memory and wherein the cache has at least two controllers of a first operation controller for performing a first operation, a second operation controller for performing a second operation, and a third operation controller for performing a third operation, and
wherein the first operation controller includes logic for performing a first operation including evicting victim cache entries from the cache memory in accordance with a replacement policy which is biased to evict cache entries having clean cache lines over evicting cache entries having dirty cache lines,
wherein the second operation controller includes logic for performing a second operation including evicting victim cache entries from the primary cache memory to the victim cache memory of the cache memory, and
wherein the third operation controller includes logic for performing a third operation including accessing cache entries of the cache memory based upon addresses of memory locations, the cache entry accessing including translating the memory location addresses to spread the memory location addresses within an address range of the byte addressable non-volatile memory.

18. The system of claim 17 wherein the cache has all three of the first operation controller, the second operation controller, and the third operation controller.

19. The system of claim 17 wherein the victim cache entries cached in the victim cache memory are exclusively cache entries having dirty cache lines.

20. The system of claim 19 wherein the victim cache memory is at least one fourth the capacity of the primary cache memory.

21. The system of claim 17 wherein the cache has the second operation controller, the cache further comprising a controller having logic for evicting cache lines having dirty cache lines from the victim cache memory, and writing the dirty cache lines of cache lines evicted from the dirty cache memory back to the byte addressable non-volatile memory.

22. The system of claim 17 wherein the third operation controller logic for translating the memory location addresses includes logic implementing an exclusive-or function for shuffling memory location addresses to spread the memory location addresses within an address range of the byte addressable non-volatile memory.

23. The system of claim 17 further comprising logic for selectively enabling and disabling at least one of the first operation controller, the second operation controller and the third operation controller as the system boots to configure the cache memory as the system boots.

24. The system of claim 17 wherein the third operation controller includes logic for multi-level address translating which includes performing the third operation at at least two of an input of the cache memory, an output of the cache memory and between the primary cache memory and the victim cache memory of the cache memory.

* * * * *